(12) United States Patent
Montalvo

(10) Patent No.: US 8,412,654 B2
(45) Date of Patent: Apr. 2, 2013

(54) METHOD AND SYSTEM FOR FULLY AUTOMATED ENERGY CURTAILMENT

(76) Inventor: Rey Montalvo, Eatontown, NJ (US)

( * ) Notice: Subject to any disclaimer, the term of this patent is extended or adjusted under 35 U.S.C. 154(b) by 753 days.

(21) Appl. No.: 12/587,564

(22) Filed: Oct. 8, 2009

(65) Prior Publication Data

US 2010/0088261 A1  Apr. 8, 2010

Related U.S. Application Data

(60) Provisional application No. 61/195,608, filed on Oct. 8, 2008.

(51) Int. Cl.
*G06N 99/00* (2010.01)
*H02J 1/14* (2006.01)

(52) U.S. Cl. .......................... 706/15; 307/31
(58) Field of Classification Search .................... 706/15; 705/7.31, 26.2
See application file for complete search history.

(56) References Cited

U.S. PATENT DOCUMENTS

| | | | |
|---|---|---|---|
| 4,106,097 A | 8/1978 | Fox et al. | |
| 4,245,319 A | 1/1981 | Hedges | |
| 4,247,786 A | 1/1981 | Hedges | |
| 4,371,779 A | 2/1983 | Maynard et al. | |
| 4,551,812 A | 11/1985 | Gurr et al. | |
| 5,544,046 A | 8/1996 | Niwa | |
| 5,761,083 A | 6/1998 | Brown, Jr. et al. | |
| 6,115,698 A | 9/2000 | Tuck et al. | |
| 6,244,516 B1 | 6/2001 | Langervik et al. | |
| 6,437,692 B1 | 8/2002 | Petite et al. | |
| 6,473,744 B1 | 10/2002 | Tuck et al. | |
| 6,519,509 B1 | 2/2003 | Nierlich et al. | |
| 6,618,709 B1 | 9/2003 | Sneeringer | |
| 6,633,823 B2 | 10/2003 | Bartone et al. | |
| 6,643,567 B2 | 11/2003 | Kolk et al. | |
| 6,681,154 B2 | 1/2004 | Nierlich et al. | |
| 6,745,105 B1 | 6/2004 | Fairlie et al. | |
| 6,775,595 B1 | 8/2004 | Yabutani et al. | |
| 6,868,293 B1 | 3/2005 | Schurr et al. | |
| 6,912,450 B2 | 6/2005 | Fairlie et al. | |
| 7,010,363 B2 | 3/2006 | Donnelly et al. | |
| 7,027,992 B2 | 4/2006 | Zaccaria et al. | |
| 7,035,179 B2 | 4/2006 | Chen et al. | |
| 7,053,767 B2 | 5/2006 | Petite et al. | |
| 7,054,271 B2 | 5/2006 | Brownrigg et al. | |
| 7,062,360 B2 | 6/2006 | Fairlie et al. | |
| 7,076,339 B2 | 7/2006 | Yabutani et al. | |
| 7,088,014 B2 | 8/2006 | Nierlich et al. | |
| 7,127,328 B2 | 10/2006 | Ransom | |
| 7,130,832 B2 | 10/2006 | Bannai et al. | |

(Continued)

OTHER PUBLICATIONS

International Search Report and Written Opinino, PCT/US09/05527, mailed Dec. 14, 2009.

*Primary Examiner* — Jeffrey A Gaffin
*Assistant Examiner* — Nathan Brown, Jr.
(74) *Attorney, Agent, or Firm* — Wall & Tong, LLP

(57) ABSTRACT

Fully automated demand response may be implemented at end users, in accordance with terms agreed to by end users to reduce energy demand during demand response events. Demand reduction actions to implement the objectives of a demand response event at the end users may be determined, desirably using artificial intelligence and neural networks, based on energy demand curtailment objectives of the demand response event, hierarchy(ies) of demand reduction actions for respective demand response events ordered to minimize undesired impact at the end users, and monitoring data received from, or relating to implementing energy demand curtailment at, the end users. In addition, demand reduction actions may be automatically implemented at end users in the absence of a demand response event, to implement energy demand curtailment according to criteria of end users, where the demand reduction actions are determined based on monitoring data and a hierarchy(ies) of demand reduction actions and using artificial intelligence and neural networks.

41 Claims, 9 Drawing Sheets

U.S. PATENT DOCUMENTS

| | | |
|---|---|---|
| 7,135,956 B2 | 11/2006 | Bartone et al. |
| 7,149,605 B2 | 12/2006 | Chassin et al. |
| 7,181,316 B2 | 2/2007 | Fairlie et al. |
| 7,188,003 B2 | 3/2007 | Ransom et al. |
| 7,206,670 B2 | 4/2007 | Pimputkar et al. |
| 7,305,282 B2 | 12/2007 | Chen |
| 7,333,880 B2 | 2/2008 | Brewster et al. |
| 7,369,968 B2 | 5/2008 | Johnson et al. |
| 7,420,293 B2 | 9/2008 | Donnelly et al. |
| 7,460,930 B1 | 12/2008 | Howell et al. |
| 7,468,661 B2 | 12/2008 | Petite et al. |
| 2002/0196124 A1 | 12/2002 | Howard et al. |
| 2003/0171851 A1* | 9/2003 | Brickfield et al. ............ 700/286 |
| 2005/0165512 A1 | 7/2005 | Peljto |
| 2008/0013596 A1 | 1/2008 | Dunne et al. |

* cited by examiner

METHOD AND SYSTEM FOR FULLY AUTOMATED ENERGY CURTAILMENT

CROSS REFERENCE TO RELATED APPLICATION

This application claims the benefit of the filing date of U.S. Provisional Patent Application No. 61/195,608 filed Oct. 8, 2008, the disclosure of which is hereby incorporated herein by reference.

BACKGROUND OF THE INVENTION

In the United States, Independent Service Operators ("ISOs") and/or their affiliates, which include Energy Curtailment Service Providers ("ECSPs"), utility companies, electrical power producers that are the primary source of electrical power supplied over an electrical power grid by the utility companies, etc., are under continuing pressure to reduce demand for electrical power ("kilowatt ("KW") demand") by customers ("end users"). The reasons for reducing demand include stabilizing the power grid so that electrical power may be reliably supplied to end users, thereby avoiding brownouts or possibly blackouts. In addition, there are economic reasons to reduce demand, which include an ISO or utility company having the ability to purchase wholesale electricity for supply over the power grid from the power producers at a reasonable price. As demand for electricity increases, the wholesale price for electricity typically increases. In the event the wholesale price for electricity exceeds certain thresholds, the ISOs and/or utility companies seek to decrease KW demand from end users to maintain the price at which the electrical power can be purchased from the power producers at reasonable levels.

When the ISOs and/or utilities determine, such as for one or more of the reasons discussed above, that there is a need to reduce KW demand during a specified time period, an energy demand curtailment strategy is pursued in the form of an energy demand curtailment event. At this time, the ISOs and/or utilities typically send an email to their ECSPs requesting that KW demand be reduced during the time period, in accordance with the demand curtailment strategies associated with the event. There may be various types of energy demand curtailment events, and the objectives of energy demand curtailment for each may differ. For ease of reference, these events for reducing KW demand at end users are referred to herein as demand response events or DR events. Following receipt of the email including the requesting for KW demand reduction from the ISOs and/or the utilities, which ordinarily identifies the DR event and its demand reduction objectives, the ECSPs, in turn, transmit an email or a facsimile to, or call by telephone, end users of the utilities who have entered into demand response agreements ("DR Agreements") with the ISOs, the utility companies and/or the ECSPs to reduce KW demand during a DR event. These DR Agreements set forth the amount of electrical load to be reduced, and when such load will be reduced, for a DR event(s) by the respective end users. The end users, who, for example, may be the owner of a building or store(s), are paid a monetary incentive to reduce KW demand in accordance with the terms of the DR Agreement. The monetary incentive, which may vary from state to state and for each ISO, utility company and/or ECSP, may provide that the end user is paid a certain sum by the ISO, utility company and/or ECSP for every kilowatt demand of electricity the end user reduced during a DR event. Alternatively, the end user may receive a discount from the ISO, utility company and/or ECSP on electricity usage rate in Kilowatt Hours ("KwH"), based on the end user reducing demand by an agreed upon amount during a DR event. For example, if the end user normally pays $0.17/KwH, the end user would pay $0.12/KwH if the end user reduces KW demand during the DR events covered under the DR Agreement.

The terms of DR Agreements to reduce KW demand, for example, may depend upon the geographic location of the end users being served by the power grid. On the east coast of the United States, the utility companies are typically deregulated, and ISOs, such as the PJM Interconnection grid that serves Delaware, Illinois, Indiana, Kentucky, Maryland, Michigan, New Jersey, North Carolina, Ohio, Pennsylvania, Tennessee, Virginia, West Virginia and the District of Columbia, have agreements directly with ECSPs, and not end users, to reduce a specified amounts of KW demand in the event of a DR event. These ECSPs, in turn, have DR Agreements with end users for the end users to reduce and/or eliminate KW Demand during a DR event.

Also, currently on the west coast of the United States, such as California where the utility companies are regulated, CASIO (California Independent Service Operator or California "ISO") operates in conjunction with the three (3) major California utility companies (San Diego Gas and Electric, Southern California Edison and Pacific Gas and Electric) to manage the electrical power grid in that geographic region. These utilities have DR agreements to curtail energy demand directly with end users and ECSPs (also known in California as Aggregators). Alternatively, the utilities may have agreements with ECSPs, and the ECSPs have DR Agreements with the end users.

The current technique of end users reducing KW demand pursuant to such DR Agreements, however, depends too much upon human involvement to implement actions to achieve the agreed upon demand reduction for the DR event at the end users. There are inherent weaknesses in the current technique, because the implementation of demand reduction for a DR event depends on a human responding to an email, fax or telephone call from an ISO, utility and/or ECSPs that provides notification of a request for demand reduction at the end user for a DR event. Although some requests for energy demand curtailment for some DR events permit hours to respond, the more critical ones, and usually most lucrative to the end users, may require a response within 10 minutes or less. The necessity for a human being involved in response efforts to reduce KW demand for a DR event is problematic for the following reasons:

1) Humans do not necessarily sit by their computers waiting for "that email" to show up, or by their fax machines waiting for "that fax" to show up. By the time a human sees and reads "that email" or "that fax," there may be little or no time to implement a response at an end user, as required for the DR event under a DR Agreement. In addition, in current office environments humans use fax machines much less than emails, which further decreases the chance of a timely response for a faxed request for demand reduction for a DR event.

2) During a DR event, certain geographic areas may already be experiencing brownouts and/or black outs, such that computers and fax machines at end users may already be inoperative when a request notification is transmitted by email or facsimile. Consequently, the human (operator) responsible to implementing demand reduction at the end user to comply with the DR Agreement never receives "that call" or "that fax."

3) Humans do not necessarily sit by their office telephones waiting for "that phone call" to come. By the time they return to their desk and listen to their voice mails, there may be little or no time to respond.

4) Humans do not necessarily carry their cell phones and/or PDAs with them at all times or, if they do, the devices may be on "vibrate." Consequently, when the request notification for energy curtailment is made, either via phone call or email, this request may be missed. In addition, by the time humans pick up their cell phone and/or PDA and listen to their voice mails or look at their emails, there may be little or no time to respond. Further, it is very common that cell phone and/or PDA coverage is bad in certain areas, such that humans may never get "that call" or "that email." In addition, it is very common that cell phone and/or PDA batteries are low or dead, such that humans may never receive "that call" or "that email" until the batteries of such devices are recharged. By such time, the end user may have missed the time period in which a response to the DR event is required under the DR Agreement.

5) Humans go on vacations, get sick, are called out on emergencies, get into accidents, fall asleep, get distracted, have higher priorities, can only accomplish so many tasks at one time, etc. All these possibilities may prevent a call for energy curtailment from being acted upon in a timely manner.

6) Humans also make mistakes. Therefore, even if a call for energy curtailment is received, appropriate action by the recipient may not be timely implemented at the end user, such that the time period in which a response to the DR event is required under the DR Agreement may have been missed.

7) Humans do not have the ability to make complex mathematical calculations with a high degree of accuracy at all hours of the day. Consequently, it is highly likely that humans will not always make the proper decisions with respect to what actions to take and/or KW demand control actions to implement, and the order in which such actions are to be implemented, based upon a multitude of criteria that needs to be evaluated simultaneously and substantially instantaneously.

Thus, based on the typical human involvement in a response to a request for energy curtailment, DR events requiring implementation of demand reduction within a short period of time are not necessarily appropriately and timely responded to by end users.

The DR events in a DR Agreement may include a "day ahead" event, for which the end user agrees to reduce KW demand the day following receipt of a DR event request from, for example, the ECSP. A "day ahead" event may arise, for example, if in the opinion of the ISO, there might be a concern of a "brown out" or "black out" the very next day and/or the demand for electricity might place the ISO and/or utility company(s) at an economic disadvantage. Currently, in most states, ISOs typically send an email for a "day ahead" DR event to the ECSPs, who in turn send relay emails, faxes and/or make phone calls to end users a day in advance of the time period when demand reduction is to begin, and sometimes only 6-10 hours in advance. Assuming a human (operator) at the end user who is responsible to implement demand reduction actions for a DR event indeed receives the notification, the operator at the end user, for example, a commercial facility, may attempt to comply by quickly moving about the facility and manually turning off electric circuit breakers and/or disconnecting switches to electrical devices having larger electrical loads. These efforts are stressful, and the larger the physical size of the end user, the more difficult it is for the operator to perform such actions. For example, an end user facility may be so large that provisions of a DR Agreement for a DR event cannot be satisfied unless a very sophisticated building automation system(s) is already in place at the end user with demand reduction strategies already preprogrammed. Even in these circumstances, however, the operator at the facility still would have to manually activate this demand response system.

In addition, the DR events in a DR Agreement may include a "day of" event, for which the end user agrees to reduce KW demand the day a request is received from the ECSP. A "day of" event may arise, if in the opinion of the ISO and/or utility company(s), there might be a concern of a "brown out" or "black out" on the day in question due to less available electricity from the grid than was expected the previous day. In other words, in the opinion of the ISO and/or utility company(s), the demand on the electric grid on the day in question may very well be greater than the supply of available electricity from the grid. This could occur, for example, because the temperature and humidity conditions on the day in question are higher than had been expected the day before; certain electric power producers had equipment malfunctions, etc. In addition, the "day of" event may arise because the ISO and/or utility company(s) are attempting to counteract a potential economic disadvantage of high demand and low supply with respect to their purchase of power from electrical power producers.

Although the monetary compensation that end users may receive for complying with a request for demand reduction for a "day of" DR event usually exceeds that associated with complying with a "day ahead" DR event, an end user usually has great difficulty in complying with demand reduction requirements of a "day of" DR event. For a "day of" DR event, KW demand reduction is usually required to begin at the end user within about 3 hours, and sometimes within 10 minutes or less, of the time of notice to the end user by a fax, an email or phone call from, for example, the ECSP. Consequently, most end users cannot comply with requirements of such DR event and do not include such a DR event in the DR Agreement. Typically, unless an end user has some sort of energy management system in place and can provide for demand reduction actions to be taken within very short periods of time, the end user does not include such DR events in the DR Agreement. In addition, although an end user having a very sophisticated building automation system(s) already in place with demand reduction strategies already preprogrammed may include such DR events in a DR Agreement, there are few of such end users and, those that do exist who attempt to manually activate such systems to reduce demand, more often than not are not able to respond quickly enough to provide for compliance with a "day of" DR event and, thus, fail, either partially or completely.

Further, when a request for demand reduction for a DR event is made to an end user, such as by email, fax or telephone, the end user itself is responsible to ensure reduction in electrical power consumption from the grid is achieved. Only after the monthly utility bills have been sent to the end user, and the ECSP has reviewed these bills for compliance with the terms of a DR Agreement does the utility compensate the end user for the energy demand curtailment. This compensation, thus, may occur as much as two to three months after the response by the end user to reduce demand load for a DR event.

Also, at an end user, the typical procedure to ensure a reduction in electricity consumption requires human involvement. A human operator monitors an electric meter(s) to confirm that demand reduction is occurring in accordance with the provisions of the DR Agreement for the DR event. This human involvement in monitoring does not permit a person (energy manager) at an end user, who is responsible for management of energy usage and demand load reduction activities, to have real time information on electric KW demand usage for the end user. In addition, although so called smart electrical power usage meters are known, such meters typically do not provide real time electric KW demand usage information to an end user or, for example, an ECSP with whom the end user has entered into a DR Agreement.

Also, the necessary involvement of humans (operators) to manually take actions to reduce demand loads makes it very difficult, if not impossible, for an end user to take advantage of real time pricing of electrical power. In a real time pricing program, which is currently offered only by a limited number of ISOs but will likely be offered by more ISOs in the future, an end user may desire to take action to reduce electrical demand if the electric rate during a given hour(s) during a 24 hour period exceeds the amount the end user is willing to pay (typically expressed in $/KWH). As the actions that need to be taken to reduce KW demand at the end user are manually implemented, it is difficult for the end user to reduce KW demand accordingly, such as in large or small amounts as needed, in real time, depending upon the real time electrical rate, in comparison to a threshold electrical rate above which the end user does not desire to pay for electrical power.

Further, some ISOs may desire, but typically are not able, to reduce significant end user loads directly from their operations, for example, to compensate for frequency modulations in the power grid distribution system. The typical technique of a human (operator) at an end user manually taking actions to reduce demand load does not permit for such direct demand reduction actions by the ISOs.

Also, ISOs, utility companies and/or ECSPs typically require that an end user have the capability of reducing at least about 100 KW-200 KW demand during a DR event, for the end user to become a party to a DR agreement. Typical residential homes, however, can reduce KW demand only by about 1-2 KW, and also many smaller commercial entities, such as standalone stores or factories, cannot reduce KW demand sufficiently to meet the requirements for becoming an end user party to a DR Agreement. Previously, some utilities have made attempts to aggregate thousands of residential homes, and reduce some KW demand by cycling the homeowner's central air conditioning compressors wirelessly during hot summer days when the grid is overtaxed. These efforts by utilities have met with some success, although the nominal financial incentives, such as $10 or so, that utilities may offer the homeowner for the entire cooling season does not provide much of an inducement for the homeowners to participate.

In addition, some utilities have undertaken more sophisticated measures to reduce KW demand, such as by installing "smart thermostats" that may provide an additional amount of KW reduction. In addition, wireless ZIGBEE devices (or equivalent) have been installed in residential homes by private companies who are partnered with certain utilities, which provide both the homeowner and the utility with access to electric KW demand usage for each homeowner and also provides the homeowner with rate information and KWH usage information. Homeowners, however, can opt out of DR events and/or not participate fully, such that, even though their initial intentions are admirable, the desired KW demand reduction sought is not achieved during a DR event.

Moreover, energy curtailment techniques have little concern for, and hence typically do not consider, human factors, such comfort or convenience. Although a homeowner initially may desire to maximize KW demand reduction, the discomfort associated with doing so, for example, the existence of higher temperatures in homes during DR events, the need to schedule use of electrical devices such as electric ovens around DR events, etc., ultimately proves intolerable, thereby causing many homeowners to abandon their demand reduction goals. Further, as discussed above, humans do not necessarily sit by their "smart thermostats" waiting for a DR event notification. By the time homeowners are actually notified of a DR event, there is little or no time to do anything about it except for possibly opting out of the DR event. As current demand reduction techniques do not include real provisions that may make homeowners and their occupants comfortable, homeowners many times simply opt out of the current DR event, next DR event or series of DR events.

Therefore, there exists a need for system and method for fully automated energy curtailment at end users, when an energy demand curtailment event arises, where human involvement is not required and undesirable impacts at the end users at which demand reduction actions are implemented are avoided.

SUMMARY OF THE INVENTION

In accordance with an aspect of the present invention, a method for fully automated energy demand curtailment not requiring human involvement includes determining, by a processor, based on electronic message data indicating a demand response event received over a communication network, a first demand response event. The electronic message data indicates one of a plurality of demand response events including the first demand response event. The processor determines one or more demand reduction actions to be implemented at one or more end users under contract to implement demand reduction for the first demand response event. The one or more demand reduction actions are determined based on energy demand curtailment objectives of the first demand response event, a hierarchy of predetermined demand reduction actions for the first demand response event available for the one or more end users and ordered to minimize undesired impact at the one or more end users, and monitoring data related to implementing energy demand curtailment at the one or more end users. A signal or control data is generated to implement the one or more demand reduction actions at least one of one or more appliances of the one or more end users and one or more supplemental energy sources for supplying energy to the one or more end users.

In accordance with another aspect, a method for fully automated energy demand curtailment not requiring human involvement includes receiving an electronic message transmitted over a communication network indicating a demand response event; processing the electronic message, by a processor, to convert the electronic message into a demand response event signal, where the demand response event signal corresponds to a first demand response event of a plurality of demand response events. In addition, the processor determines one or more demand reduction actions to be implemented automatically at one or more end users under contract to implement demand reduction for the first demand response event. Further, a signal or control data is generated to implement the one or more demand reduction actions at one or more energy devices of, or associated with, the one or more end users.

In another aspect, an apparatus for fully automated energy demand curtailment not requiring human involvement includes a demand response event determination unit to determine, based on electronic message data indicating a demand response event received over a communication network, a first demand response event. The electronic message data indicates one of a plurality demand response events including the first demand response event. The apparatus further includes a demand reduction action unit to determine one or more demand reduction actions to be implemented at one or more end users under contract to implement demand reduction for the first demand response event, where the one or more demand reduction actions are determined based on energy demand curtailment objectives of the first demand response event, a hierarchy of predetermined demand reduction actions for the first demand response event available for the one or more end users and ordered to minimize undesired impact at the one or more end users, and monitoring data related to implementing energy demand curtailment at the one or more end users. In addition, the apparatus includes a demand reduction action signal generator to generate a demand reduction action signal to implement the one or more demand reduction actions at least one of one or more appliances of the one or more end users and one or more supplemental energy sources for supplying energy to the one or more end users.

In a further aspect, an apparatus for fully automated energy demand curtailment not requiring human involvement includes a monitoring data unit to create monitoring data based on information supplied by or acquired from an appliance of an end user, an energy consumption meter of the end user, and an environmental conditions and appliance operational status monitor of the end user connected to the apparatus. The apparatus also includes a generator to generate a signal or control data to implement one or more demand reduction actions at least one of an appliance of the end user and a supplemental energy source for supplying supplemental energy to the end user, based on a demand reduction signal received at the apparatus. The demand reduction signal indicates the one or more demand reductions actions which have been determined in accordance with a first demand response event determined from an electronic message data received over a communication network. The one or more demand reduction actions are to be implemented at the end user who is under contract to implement demand reduction for the first demand response event. Also, the one or more demand reduction actions are determined based on energy demand curtailment objectives of the first demand response event, a hierarchy of predetermined demand reduction actions for the first demand response event available for the end user and ordered to minimize undesired impact at the end user, and the monitoring data. In one embodiment, the monitoring data includes feedback data indicating whether or not operational status of an appliance or supplemental energy source changed, for example, the appliance turned off or the supplemental energy source began supplying electrical power, after the signal or the control data was generated to implement a demand reduction action.

In a further aspect of the invention, a method for fully automated energy demand curtailment not requiring human involvement includes determining, by a processor, one or more demand reduction actions to be implemented automatically at one or more end users who provide criteria for implementation of demand reduction. The one or more demand reduction actions are determined based on a hierarchy of predetermined demand reduction actions available for the one or more end users and ordered to minimize undesired impact at the one or more end users, and monitoring data related to implementing energy demand curtailment at the one or more end users. The processor may generate a signal or control data to implement the one or more demand reduction actions at least one of one or more appliances of the one or more end users and one or more supplemental energy sources for supplying energy to the one or more end users.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

Figure 1:
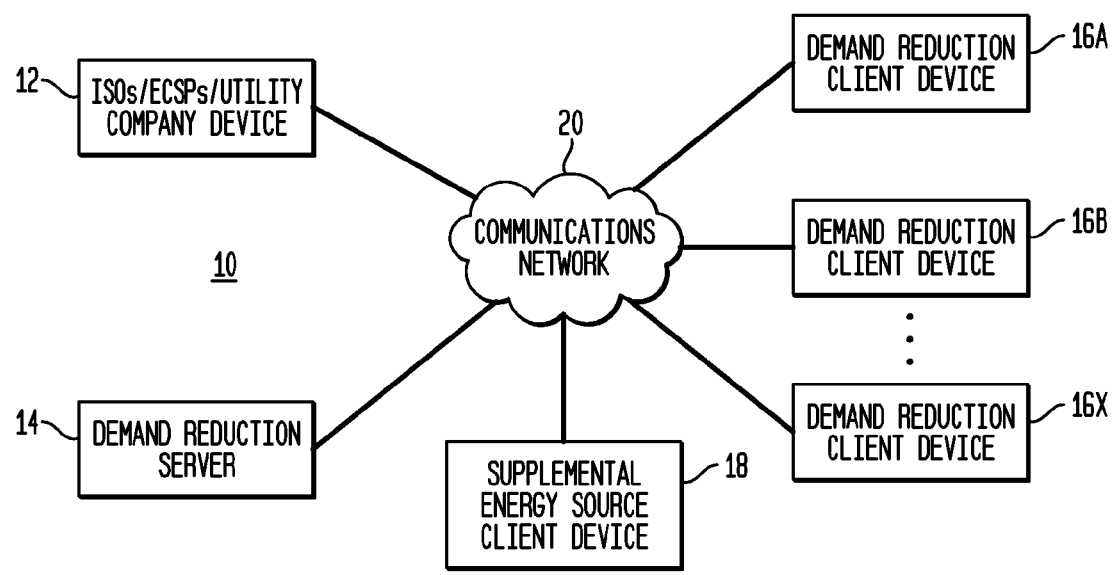
FIG. 1 is a block diagram of an exemplary system in accordance with an aspect of the present invention.

In one aspect, the inventive system and method implements, upon the occurrence of a demand response event ("DR event"), fully automated demand response to reduce KW demand at end users who are supplied electricity over an electrical power grid. The end users have entered into demand response agreements ("DR Agreements") with ISOs, ECSPS and/or utility companies, who provide for the supply of electricity to the end users, to reduce KW demand for DR event(s), where demand reduction actions are automatically implemented at the end users without human involvement, in accordance with the terms of the DR Agreements and to minimize undesired impact at the end users.

For ease of describing the inventive method and system, the terms defined above are used herein and also the following definitions of terms is provided.

Definitions

End user: Any entity connected to an electrical power grid who may consume electricity supplied over the power grid and is customer of an ISO, ECSP and/or utility company. The entity, for example, may be a commercial or residential facility, such as a factory, an office building, a campus, a hotel, etc. In addition, a facility may include any defined space or region of a structure, such as a room or floor of a commercial or residential building; spaces within one or more buildings; a plurality of buildings; and any combination of spaces within respective buildings. For example, an entity may be an aggregation of commercial facilities, such as a shopping mall containing a plurality of stores, a collection of stores that are geographically separate, such as various stores of a franchise located throughout a city or state, or a collection of residential units, such as residential homes within a development or a group of residential apartment buildings.

Appliance: Any device of an end user that consumes electrical power to operate, such as a computer, A/C unit, lighting, etc., and is connected to consume electrical power supplied over the electrical power grid by a utility company, or alternatively supplied from a supplemental energy source.

Supplemental Energy Source ("SES"): A facility or a device, such as a solar panel, generator, cogeneration system, gas fired absorption chiller, gas fired absorption chiller/heater, etc., that may generate or may be controlled to generate, electricity, and may be controlled to supply the generated electricity as supplemental electrical power to an end user for consumption by an appliance of the end user. As discussed below, activation of an SES may provide the end user with the ability to switch from a very expensive electricity source to an alternative natural gas source which is typically much less expensive than electricity and, thus, opens up the opportunity for the end user to receive additional financial benefit from the extra KW demand curtailed based on this "fuel switching" activity. The supplemental energy source may be located at a standalone end user, at end users that are part of an aggregated end user, at a third party energy source or an electric substation, such as those typically subject to brownout conditions due to their distance from the primary power producers of electrical power supplied on the power grid.

Energy Device: Any appliance at an end user or any supplemental energy source.

Exterior Environmental Data: Information describing environmental conditions, such as temperature and relative humidity, outside a building or facility of an end user. The information may be obtained from conventional environmental sensors located at or near the geographic area of the end user, such as a temperature and/or Relative Humidity sensor, having the capability to create or supply electronic environmental information that may be communicated over a communication network or wired or wireless communication links; or from third parties, such as weather monitoring entities, that make information, such as weather related information, for geographic areas including or nearby the geographic area of the end user available for supply or acquisition over a communication network.

Interior Environmental Data: Information describing environmental conditions, such as temperature and relative humidity, within an interior space(s) of a facility of an end user. The information may be obtained from conventional temperature and relative humidity sensors located within a facility of the end user and having the capability to create or supply electronic environmental information, that may be communicated over a communication network or wired or wireless communication links.

Appliance Operation Data: Information describing whether an appliance of an end user is operating ("ON"), so as to be consuming electricity, or not operating ("OFF"), so to not be consuming electricity; and the status or mode of operation of the appliance when the appliance is ON, such as, for example, the temperature and/or Relative Humidity setting of a temperature and/or Relative Humidity sensor of an A/C system, the temperature setting of a furnace and the operating speed of a motor or fan.

Supplemental Energy Source Operation Data: Information describing whether a supplemental energy source is supplying supplemental electrical power for consumption by an end user; and the status or mode of operation of the supplemental energy source, such as, how much electrical power is being supplied in KWH and KW.

Monitoring Data: Appliance operation data, supplemental energy source operation data, interior environmental data, and exterior environmental data collectively.

Demand Response Event ("DR event"): The result of a determination that there is a need to implement energy demand curtailment actions at end users to achieve demand load reduction objectives during a defined time period. A DR event may include, for example, a "day ahead" event, a "day of" event and a frequency modulation event.

Frequency Modulation Event: A requirement that an end user reduce an amount of KW demand, which is usually significant, such as in excess of about 1000 KW, substantially instantaneously.

Demand Reduction Action: An action taken to implement demand load reduction at an end user, in accordance with a DR event and the provisions of a DR Agreement, or alternatively at a time other than during a DR event. The action may include reducing or eliminating consumption of electricity from the power grid at an appliance(s) of the end user, turning ON and/or controllably operating a selected appliance(s) at the end user, and/or causing supplemental energy from a supplemental energy source to be supplied to the end user for consumption by an appliance(s) of the end user.

FIG. 1 is an exemplary system 10 for implementing fully automated demand response, in real time or substantially real time, at one or more end users without human involvement, in accordance with an aspect of the present invention. Referring to FIG. 1, the system 10 may include a computer 12, a demand reduction server computer ("DR server") 14, demand reduction client devices ("DR clients") 16 and a supplemental energy source client device ("SES client") 18. Each of the computers 12 and 14, the DR clients 16 which for purposes of the exemplary illustrated embodiment are computers, and the SES client 18 has communication capabilities and may be communicatively coupled to a communications network 20.

As discussed in detail below, the computer 12 may be operated by ISOs and/or their affiliates, such as ECSPs, utility companies and the like, to transmit, over the network 20, electronic message data to the DR server 14 and the DR clients 16. Further, the DR server 14 transmits data to and receives data from the DR clients 16, and optionally the SES client 18, via the network 20, to implement fully automated demand response at end users with which the DR clients are associated, in accordance with the terms of DR Agreements to which the end users are parties.

Figure 2:
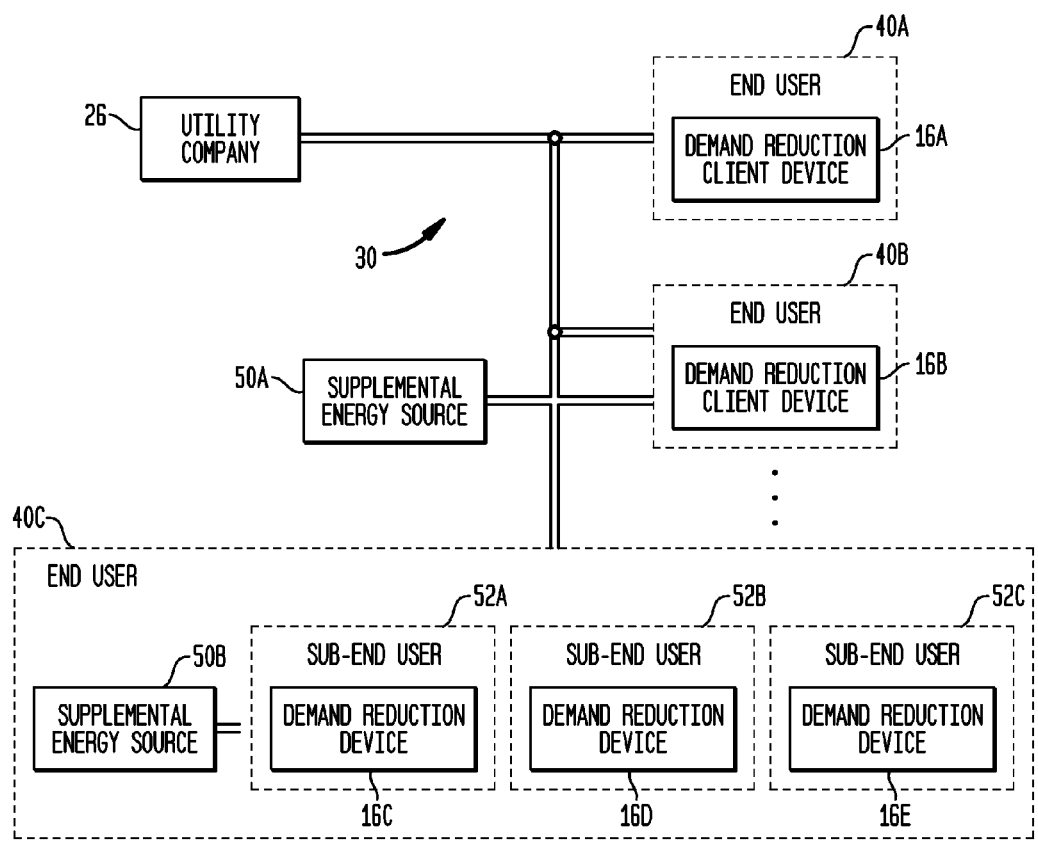
FIG. 2 is a block diagram of end users arranged to receive electrical power from an electrical power grid and supplemental electrical power sources, in accordance with an aspect of the present invention.

Further referring to FIG. 2, in an exemplary embodiment, a utility company 26, who is an operator or affiliate of an operator of the computer 12, may supply electrical power over a power grid 30 to end users 40A, 40B and 40C, who are customers of, and consume electrical power supplied over the grid 30 by, the utility company 26. In addition, supplemental energy sources 50 may be controlled, for example, by the DR server 14 or the DR clients 16 who communicate with the SES clients 18 respectively associated with the sources 50, to generate and supply supplemental electrical power to the end users 40.

In one embodiment as shown in FIG. 2, the end user 40C may include a plurality of end users 52A-52C ("sub-end users") associated with a respective plurality of DR clients 16C, 16D and 16E. The end user 40C constitutes an aggregate of sub-end users 52, where each sub-end user may be a commercial entity and/or a residential unit whose KW demand, when taken independently, is not be large enough to permit the sub-end user to qualify for participation in a demand response program of an ISO, utility company and/or ESCP, such as the utility company 26. The end user 40C, or aggregated end user, has an aggregated KW load that is sufficiently high to permit the end user 40C to be a party to a DR Agreement to reduce KW demand.

For example, the end user 40C may be an aggregation of sub-end users who are residential homeowners. A typical residential home can only reduce about 1-2 KW of electrical load during a DR event, such that a single residential home, by itself, would not qualify to become an end user that can enter into a DR Agreement with the ISO/utility company and/or ECSP, whose minimum requirement for demand reduction for a DR Agreement is typically about 100 KW-200 KW. Consequently, the aggregation of residential homeowners into a group to form an aggregated end user permits the individual homeowners to participate in demand reduction, in accordance with a DR Agreement. It is to be understood that the end user 40C may include any aggregation of residential homeowners and/or commercial entities, such as stores, who by themselves would not qualify to become an end user that is a party to a DR Agreement.

Figure 3:
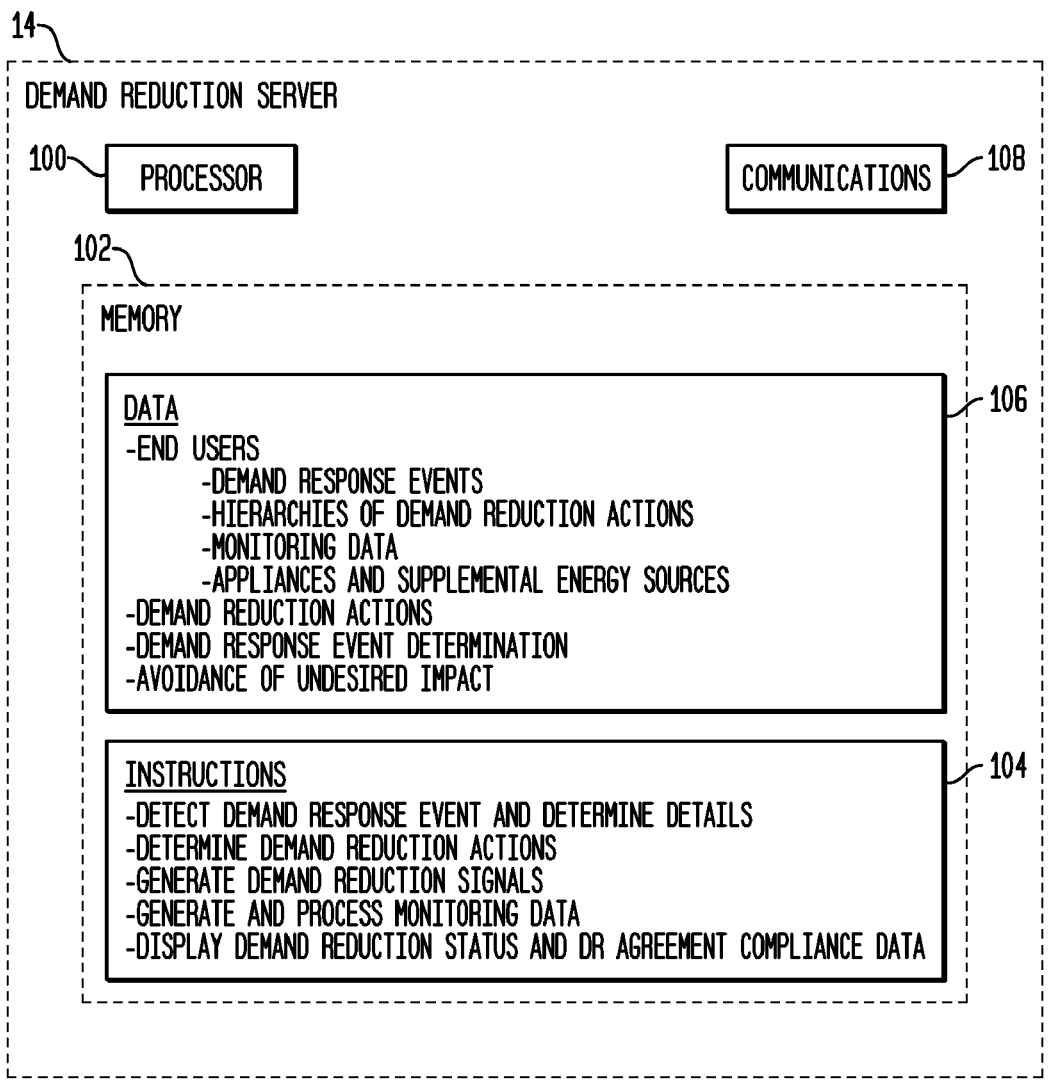
FIG. 3 is a block diagram of an exemplary demand reduction server, in accordance with an aspect of the present invention.

Referring to FIG. 3, in one exemplary embodiment, the DR server 14 may include a processor 100, a memory 102, a communications network interface device 108 and other components typically present in a general purpose computer.

The memory 102 stores information accessible by the processor 100, including instructions 104 that may be executed by the processor 100. The memory 102 also includes data 106 that may be retrieved, manipulated or stored by the processor 104. The memory 102 may be of any type capable of storing information accessible by the processor, such as a hard-drive, memory card, ROM, RAM, DVD, CD-ROM, write-capable, read-only memories, etc.

The processor 100 may be any well-known processor, such as processors from Intel Corporation or AMD. Alternatively, the processor may be a dedicated controller such as an ASIC.

The instructions 104 may be any set of instructions to be executed directly (such as machine code) or indirectly (such as scripts) by the processor 100. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 106 may be retrieved, stored or modified by the processor 100 in accordance with the instructions 104. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 3 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The communications network interface device 108 is capable of establishing wired or wireless communication links with other devices over a communication network, such as the network 20.

The network 20 is any wired or wireless communications network, such as the Internet, a WLAN, a LAN, etc.

Referring to FIG. 3, the data 106 in the DR server may include information describing the terms of DR Agreements between end users and an ISO, utility company and/or ECSP to achieve KW demand reduction goals for particular DR events set forth in the DR Agreement. For each DR Agreement, the information in the data 106 describes those demand response events for which the end user agrees to reduce KW demand by implementation of one or more demand reduction actions; the demand reduction actions that the end user agrees may be implemented for a specific DR event; and a hierarchy or hierarchies indicating an order in which demand reduction actions are to be implemented for a specific DR event, where the demand reduction actions are ordered in the hierarchy or hierarchies to minimize an undesired impact at the end user during a DR event.

In addition, for each end user, the data 106 includes monitoring data that may be used by the processor 100 to determine a demand reduction action to be taken for a DR event. The monitoring data may include, for each end user, historical and real time exterior environmental data; historical and real time interior environmental data; historical and real time energy consumption data describing consumption of electrical power supplied from the power grid or from a supplemental energy source; historical and real time energy generation data describing generation of electrical power from a supplemental energy source that may be controlled to supply supplemental electrical power to be consumed by an appliance at the end user; real time energy device operation information describing the operating status of appliances at the end user and the operating status of supplemental energy sources for supplying supplemental electrical power to the end user, which includes whether the energy devices are "ON" and "OFF" and also the mode of operation of the energy devices. For example, the monitoring data may include html documents acquired from or supplied by third parties over the network 20 which including current weather and next day weather information for a geographical area local to an end user.

Further, the monitoring data may include change information representative of changes to thresholds associated with appliance operation at an end user that may be supplied from the end user, such as via the DR client 16, after the DR Agreement has been established. This threshold information may include environmental limits, such as a maximum temperature within an interior of a facility ("space temperature") of the end user, electricity pricing limits and times when certain appliances cannot be turned off. In one embodiment, the change information is supplied before a DR event, or alternatively during the course of a DR event, such as when an end user decides to partially or fully opt out of a DR event and input data is supplied that operation of selected or all appliances at the end user not be controlled, for example, turned OFF, during a DR event.

The data 106 further includes information representative of the appliances of the end user whose operation may be controlled, and the supplemental energy sources that may be controlled to generate and supply supplemental electrical power to the end user.

The data 106 also includes information describing types of DR events, and information for determining whether data included or derived from electrical message data, such as an email, XML document or SOAP document, received at the DR server 14 over a communication network, such as the network 20, corresponds to a request for demand response for a specific DR event. The DR events may include, for example, a "day ahead" event, a "day of" event and a frequency modulation event.

The information in the data 106 further provides that the processor 100 may determine, from the received, electronic message data, the details of the DR event, such as the start time, stop time and how much KW demand is to be reduced during, and also at what times during, the event.

The data 106 in the server 14 also includes information indicating an extent that demand reduction actions may cause an undesirable impact at an end user, and that the processor 100 may use, when implementing artificial intelligence methodologies, and desirably in conjunction with use of neural networks, to order demand reduction actions in a hierarchy or hierarchies to minimize undesirable impact at an end user. For example, such information may be used to prioritize reducing KW demand by reducing KW demand initially using appliances at the end user having lower power loads and progressively reducing KW demand by appliances at the end user having higher power loads, such as an HVAC rooftop unit, which have satisfied or nearly satisfied operational set points, such as a space temperature of a facility being at or near a temperature setting on a thermostat of the HVAC unit. In addition, the information may indicate the extent to which a demand reduction action, for example, may cause discomfort for an occupant of a building of an end user, may adversely impact a manufacturing process likely to be performed at an end user having a manufacturing facility, and may adversely impact a data center, such as a computer operation center, of an end user that likely needs to be operating continuously to avoid an unsafe condition or the end user suffering a substantial financial loss.

The instructions 104 in the server 14 may include instructions that the processor 100 may execute to detect receipt of electronic message data, such as email, XML documents or SOAP documents, at the communications device 108 transmitted over the network 20 from an ISO, utility company and/or ESCP, process the electronic message data, by performing a conversion or translation using data in the data 106, to determine a DR event indicated by the electronic message data, and also the details of the DR event, such as the timing and demand load reduction requirements, included in the electronic message data.

Further, the instructions 104 may include instructions that the processor 100 may execute to determine one or more demand reduction actions to be implemented for a detected DR event at an end user, based on the end user DR Agreement data 106 included in the memory 102. The determination of the demand reduction action is based on the objectives and details included in the electronic message data for the DR event, and the data 106 of hierarchies of demand reduction actions, the monitoring data, and the appliance and supplemental energy source data, and the end user specified objectives or thresholds for KW demand reduction. In one embodiment, the instructions 104 may include instructions to achieve a KW demand reduction goal for a DR event at an end user by determining a demand reduction action using artificial intelligence and/or fuzzy logic and/or neural networks according to the hierarchies and to avoid undesired impact at the end user.

Also, the instructions 104 may include instructions that the processor 100 may execute to generate demand reduction action signals to be transmitted by the communications device 108. These demand reduction action signals may be transmitted to (i) a DR client 16 to provide for control operation of appliances at an end user by the DR client 16, and (ii) a SES device 18 to provide for control of generation and supply of supplemental electrical power to the end user from a supplemental energy source, during the course of a DR event.

In addition, the instructions 104 may include instructions that the processor 100 may execute to process monitoring data received, over the network 20, from DR clients 16 and also from other sources, such as third party weather data sources, supplying monitoring data; and to store the monitoring data as data 106 in the memory 102 that the processor 100 may use to determine a demand reduction action for an end user.

The instructions 104 may further provide that the DR server 14 may function as a web server that may be accessed by a computer, such as the DR client 14, and provide access to data associated with an end user based on supply of a correct user name and password. In addition, the instructions 106 may provide for generation of screen displays on a browser of the accessing device. In one embodiment, the instructions 106 may provide for generation of screen displays showing real time and historical information-representative of: electrical power consumption at an end user, supplemental electrical power generation by supplemental energy sources and usage of such supplemental electrical power by the end user, operating status of appliances of the end user and supplemental energy sources, and cost saving achieved based on the end user implementing demand response in compliance with the terms of a DR Agreement.

In one embodiment, the processor 100 may store in the data 106 electrical power consumption data included in the monitoring data received from the DR clients in 15 minute increments, and also data representative of all requests received from a utility Company and/or ECSP for energy demand curtailment.

In a further embodiment, the processor 100 may store in the data 106, for an end user, data representative of instances of KW demand first dropping to zero or changing from zero to greater than zero KW demand. In addition, the processor 100 may store in the data 106, for an end user, data representative of analog loads of an appliance, such as Variable Frequency Drives and chiller reset curves that will vary KW from 0%-100% of their total KW load.

Figure 4:
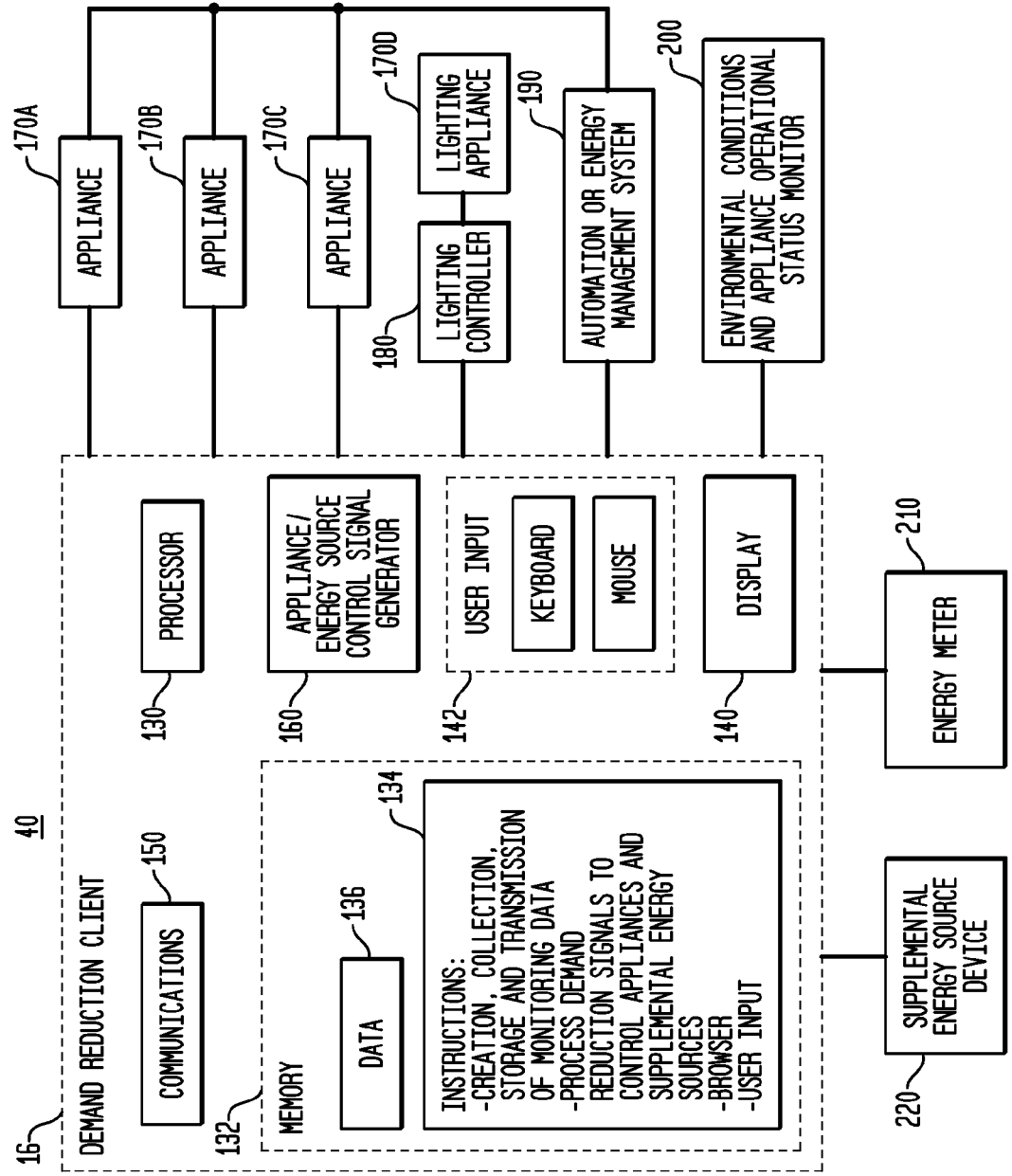
FIG. 4 is a block diagram of an exemplary end user including a demand reduction client, in accordance with an aspect of the present invention.

Referring to FIG. 4, in one embodiment an end user 40 may include a DR client 16 which is electrically and/or communicatively connected to appliances 170, a lighting controller 180 which is electrically connected to a lighting appliance 170D, and an automation control or energy management system 190 which is electrically connected to some or all of the appliances of the end user 40.

In addition, the DR client 14 is communicatively connected to an environmental conditions and appliance operating status monitor 200, an electrical power consumption meter 210 and a supplemental energy source ("SES") client device 220.

The DR client 16 may be configured similarly to the DR server 14, with a processor 130 and a memory 132 containing instructions 134 and data 136. For example, the DR client 16 may be a personal computer, intended for use by a person, having all of the internal components normally found in a personal computer, such as a central processing unit (CPU), a display device 140 (for example, a monitor having a screen, a projector, a touch-screen, a small LCD screen, a television, or another device such as an electrical device that is operable to display information processed by the processor), CD-ROM, hard-drive, a user input 142, such as a mouse, keyboard, touch-screen or microphone, speakers, and a communications network interface device 150 and all of the components used for connecting these elements to one another.

The user input 142, for example, may serve as an interface that permits a human ("operator") at an end user to modify set points, such as environmental limits and appliance operation limits, or to opt out of participation in a DR event prior to and/or during a DR event.

The instructions 134 of the DR client 16 may include instructions that the processor 130 may execute to create monitoring data from information supplied to the DR client 16, or acquired by the DR client 16 from, the monitor 200, the meter 210, the SES client device 220 and the appliances 170; to store all or portions of the monitoring data in the data 136; and to transmit the monitoring data, in real time or substantially real time, over the communication network 20 to the DR server 14.

In addition, the instructions 134 may include instructions that the processor 130 may execute to process data included in demand reduction action signals received from the DR server 14 and, in turn, provide for generation of energy device control signals and/or control data by the generator 160 and output of such control signals and/or control data to the appliances 170 and the SES client 220 to control operation, respectively, of the appliances 170 and a supplemental energy source(s), such as the source 50B, associated with the SES device 220.

In addition, the instructions 134 may include instructions that the processor 130 may execute to process signals and/or electronic data received directly from an ISO, utility company and/or ECSP, and, in turn, provide for generation of energy device control signals and/or control data by the generator 160 and output of such control signals or control data to selected appliances 170 to control their operation.

Also, the instructions 134 may provide for generation of control signals at the generator 160 that may be supplied to the lighting controller 180 or the management system 190 to have the controller 180 or the system 190, in turn, control operation, respectively, of the lighting appliances 170D and one or more of the appliances 170.

In addition, the instructions 134 may provide that the processor 130 causes electronic message data, such as email, XML documents or SOAP documents, received over the communication network 20 from the ISOs, utility company(s) and/or ESCPs to be transmitted, in real time, from the DR client 16 to the DR server 14.

Further, the instructions 134 may provide that the processor 130 includes a browser for facilitating communications over the network 20 and accessing a website of the DR server 14.

The energy meter 210 is a conventional or "smart" device that may be connected at the point at which electrical power from the grid is supplied to an end user, and also an electrical power line on which supplemental electrical energy is supplied to the end user. The meter 210 includes components for monitoring usage of electrical power from the grid and the supplemental energy source, and transmitting, over a wireless or wired communication network, to the DR client 16, in real time, data representative of the electrical power being consumed from the power grid and the supplemental energy source that supplied supplemental electrical power to the end user 40. In one embodiment, the energy meter 210 may be a sub-meter, smart meter or like meter which provides to the DR client 16 such electrical power related information as KW demand, KWH usage, voltage phase, amperage phase, power factor, KVAR and harmonics.

The monitor 200 is a device that may be connected to the appliances 170, and conventional electronic environmental sensors, such as electronic temperature and relative humidity sensors located within an interior and exterior to a facility of the end user. The monitor 200 may generate or collect data representative of environmental information available at the sensors, and also of the operating status of appliances, such as whether the appliance is ON or OFF, the mode of operation of the appliance, and how much electrical power the appliance is consuming in real time, which may be provided as energy consumption information from a conventional or "smart" energy meter included as part of the appliance. The monitor 200 transmits the generated or collected data to the DR client 16 in substantially real time, where the DR client 16 converts the received data into monitoring data as described above.

The SES device 220 is an electronic device for controlling operation of the SES, such as the SES 50B, based on control signals or control data received from the DR client 16, or alternatively received directly from the DR server 14.

The lighting controller 180 and the system 190 are electronic control devices for controlling operation of appliances connected thereto, according to preprogrammed instructions which may provide for timed activation ("ON" or "OFF"), variable speed control, reset of operating level, such as reset of a chiller, or activation of selected appliances to operate in selected modes at predetermined times. The lighting controller 180 and the system 190 may include a microprocessor that generates and transmits control signals or control data according to the pre-programmed instructions and based on a control signal or control data received from the DR client 16. In one embodiment, the DR client 16 may be incorporated into the controller 180 and the system 190, such as in the form of a microchip or like hardware, which includes a processor and a memory with instructions and data as described above.

It is to be understood that, although the DR server or the DR clients 16 may comprise a full-sized personal computer, the system and method may also be used in connection with mobile devices capable of wirelessly exchanging data with a server over a network such as the Internet. For example, the DR clients may be a wireless-enabled PDA such as a Blackberry phone, I-Phone or an Internet-capable cellular phone.

In one embodiment, the DR server 14 and the DR client 16 may be configured for each end user and each ISO, utility company(s), and/or ECSP(s) to comply with the standard communication protocol of each.

Figure 5:
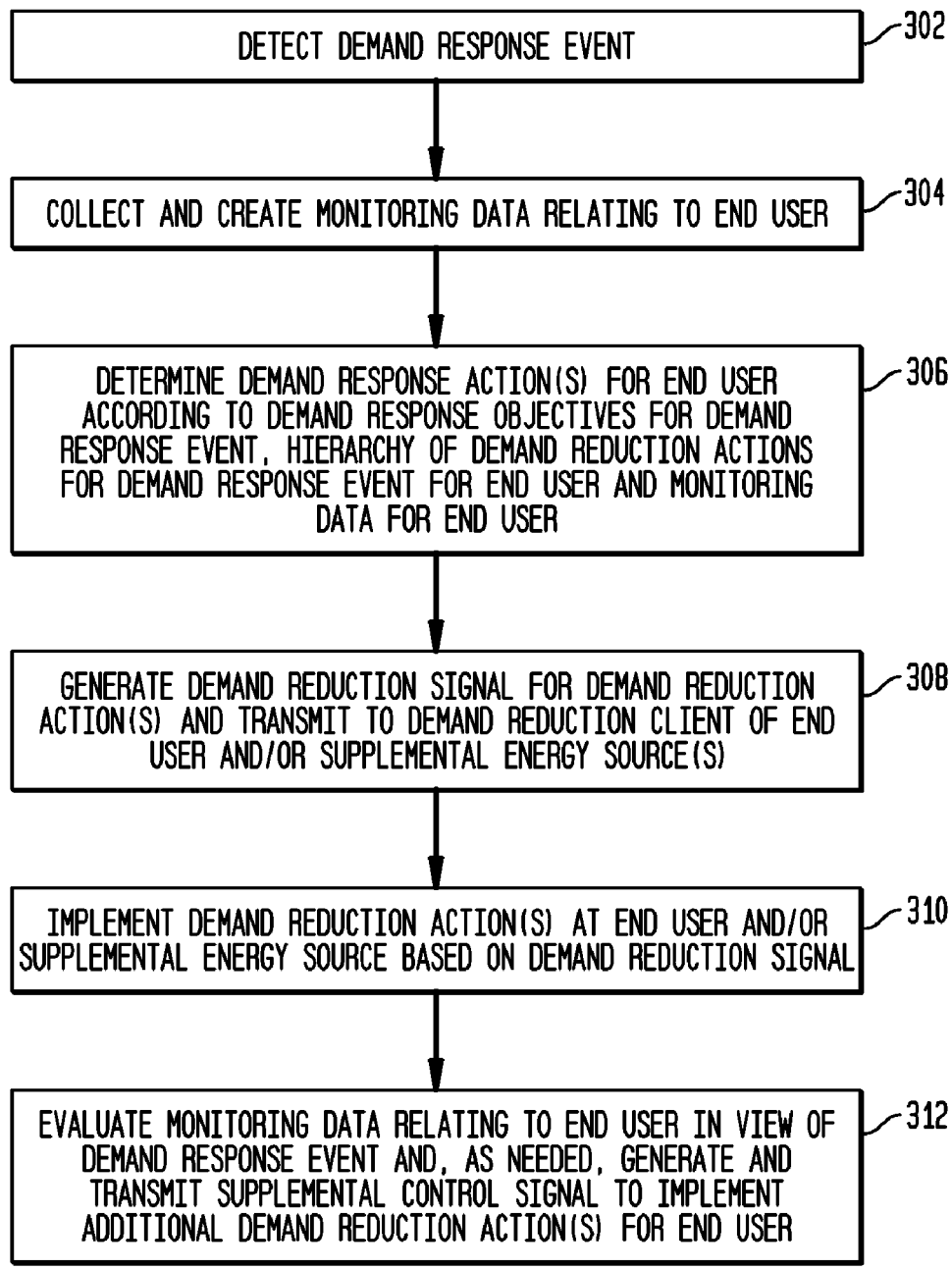
FIG. 5 is a flow diagram of an exemplary process, in accordance with an aspect of the present invention.

In accordance with an aspect of the present invention, a fully automated demand response is implemented in substantially real time based on electronic message data transmitted from a utility, ESCP and/or ISO, where demand reduction actions are automatically implemented at end users that are party to a DR Agreement in accordance with a DR event indicated by or included in the electronic message data to achieve demand reduction objectives for the utility, ESCP and/or ISO, associated with the DR event. The demand reduction actions desirably are determined in accordance with a hierarchy of demand reduction actions to minimize undesired impact at the end users and based on monitoring data for the end user. For purposes of highlighting features of the present invention, an exemplary process 300 for fully automated demand response, as shown in FIG. 5, is described below in connection with operations performed at components of the system 10, as described at FIGS. 1-4, for implementing demand reduction actions at end users 40. Although the invention is described below as the DR server 14 performing substantially all of the processing to determine demand reduction actions for implementing the fully automated demand response at the end users, it is to be understood that the some or all of the operations performed at the DR server 14 may be performed at the DR client 16 and some or all of the operations performed at the DR client 16 may be performed at the DR server 14. In addition, the invention is described below with reference to FIGS. 6-9, which illustrate exemplary signal flows, according to aspects of the present invention, to implement fully automated demand reduction actions, which require no human intervention, to reduce KW demand at an end user(s).

Referring to FIGS. 1 and 3-5, in block 302 the processor 130 of the DR client 16 continuously monitors whether electronic message data transmitted over the network from an ISO, UTILITY and/or ECSP, or like affiliate, is received and, upon determining receipt, immediately transmits the electronic message data over the network 20 to the DR server 14. The DR server 14 is typically located remotely from the DR client 16, which is typically located at or near a facility of the end user. The electronic message data may be in the form of, or included in, an email, an XML document, a SOAP document or a like electronic document or electronic signal. The DR server 14, in turn, detects the receipt of the electronic message data from the DR client 16, and then processes the electronic message data to identify the type and details of a DR event indicated by the electronic message data. The DR event and its details may be viewed over the network 20, such as by a human (operator) of the end user, by the operator using the DR client 16 to browse to the ISP address of the DR server 14 and entering a username and password.

Advantageously, the DR event and its details may be determined at the DR server 14 without human intervention, and also desirably without use of open communication protocols that some ISOs use to provide notification of a DR event. In one embodiment, the processor 100 may translate or convert the electronic message data received from the ISO into standard communication protocols such as BACNET, LON WORKS, MODBUSS and OBIX.

In an alternative embodiment, only the DR server 14 is configured to receive an electronic message data transmitted from the ISO, utility company and/or ECSP over the network 20, and upon receipt processes the received electronic message data to determine the indicated DR event and its details.

In block 304, monitoring data is continuously created at the DR client 16, and also received or acquired from other sources over the network 20, either at the DR server 14 or the DR clients 16. The DR server 14 stores the monitoring data, which includes the monitoring data created at the DR client 16 that is transmitted to the DR server 14, as the data 106 in the memory 102. The processor 100 may use the monitoring data to determine demand reduction actions for end users for a DR event. Referring to FIGS. 6-9, the monitoring data may be created, for example, from electrical power usage information supplied by a utility meter, smart meter or sub-meter, from temperature and relative humidity data provided at electronic temperature and relative humidity sensors, from sensors that monitor light levels within the interior and exterior of a facility of an end user, and from appliance operational status devices that provide information regarding the operating status of appliances, etc. For example, as discussed above, the monitoring data may include outdoor air temperature and relative humidity at the end user, local weather data, electricity usage data available at utility revenue meters within the end user, such as electric revenue meters, and electricity usage data available at additional meters, such as electric, gas, steam, water, etc. In addition, the monitoring data may include real time status of operation of appliances 170 of the end user and operating status of the supplemental energy source controlled by the SES client 220.

In block 306, the processor 100 of the server 14 may automatically determine one or more demand reduction actions to be implemented at an end user 40 for the DR event determined in block 302. The demand reduction actions are desirably determined to minimize undesired impact at the end user and in accordance with the demand response objectives for the DR event, a hierarchy or hierarchies of demand reduction actions for the DR event that may be implemented for the end user and the monitoring data relating to the end user.

In one embodiment, the hierarchies of demand reduction actions for the end user may provide for activation of lower KW demand load initially, and the demand reduction actions may be selected in view of real time and historical monitoring data relating to electrical energy consumption for the area corresponding to the end user and by performance of algorithms, including use of artificial intelligence and fuzzy logic along with neural networks, that minimize undesired impact at the end user.

For example, the initial activation of appliances having lower KW demand loads, according to a hierarchy, may include activation of low power heat reclamation fans or low power destratification fans, which an end user does not usually use when a DR event is not occurring. In addition, heat purge systems, which provide for natural cross-through ventilation in a facility by automatically opening lower and upper level windows or louvers, may be initially activated to permit cooler air to enter the facility through the lower windows (or louvers) and exhaust warmer air through the upper windows (or louvers) utilizing a low power exhaust system. Also, low power swamp coolers, which end users in dry or arid climates may use, may be activated initially.

In addition, low power desiccant systems, if available at an end user, may be initially activated. The desiccant systems may be activated according to a hierarchy where a desiccant system utilizing a solar thermal desiccant is utilized first if available, and if not, then a desiccant system using a solar photovoltaic desiccant is utilized if available, and if not, then a less expensive natural gas or propane supplemental energy source may be utilized to regenerate the desiccant wheels of such systems. It is noted that the final choice in such hierarchy of desiccant systems may be the first choice when a DR event is not occurring. Further, the desiccant systems may be operated first using electricity from solar photovoltaic units if available, and if not, then from standby gas or diesel generation. It is noted that electricity supplied by a utility over the power grid may be the primary choice for operating such systems outside of a DR event. The desiccant system may remove sufficient latent heat from the outside air and thus require less electricity be used to cool an interior space within a facility of the end user.

In another embodiment where the DR event is a "day ahead" event, the demand reduction action may be to activate a thermal storage device, such as several hours before the start of the "day ahead" event when electricity is less expensive, such as during the night, to generate ~28° F. chilled glycol. The chilled glycol then may be used to cool a building of the end user during the event the next day. At times other than during the DR event, electric cooling or a combination of electric cooling and thermal storage may be used to cool the building.

Figure 6:
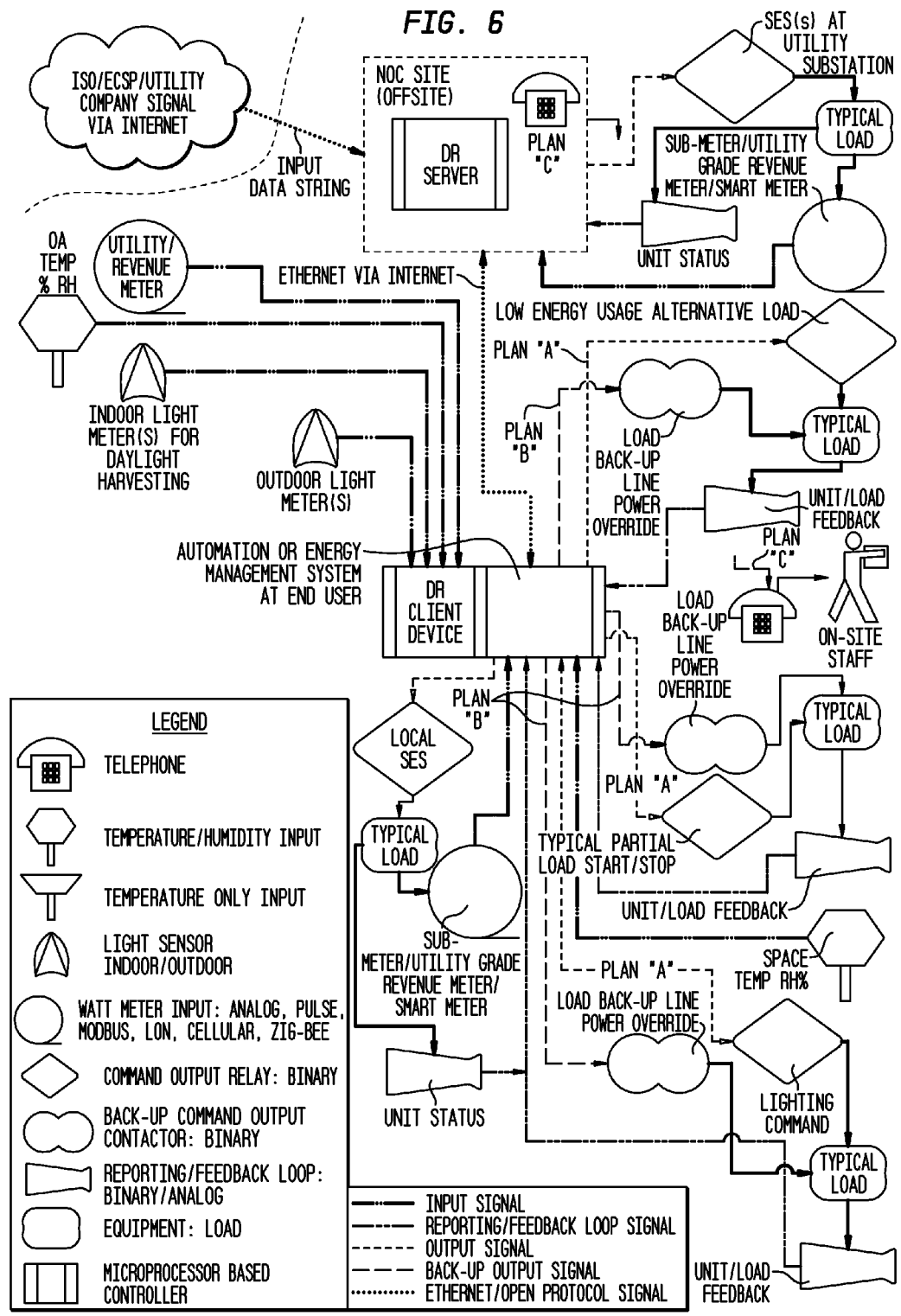
FIG. 6 is an exemplary signal flow arrangement, in accordance with an aspect of the present invention.

Referring, for example, to FIG. 6, in a further embodiment where the DR event is a "day ahead" event, historical monitoring data representative of the amount of daylight typically provided to the interior of a commercial facility through, for example, diffuse, solar tracking or Solatube® (or equivalent) skylights ("daylight harvesting" monitoring data) may be used at the DR server to determine whether lighting appliances may be turned off at the end user during the DR event, such that less electric lighting is used during the event.

In a further embodiment, the DR server may use real time monitoring data indicating daylight harvesting within a space of a facility of an end user, outside of the time of a DR event, to reduce KW demand, such as by determining a demand reduction action to turn off or dim lighting appliances within the space of the facility when the daylight harvesting monitoring data indicates there is sufficient natural light in the space.

In still another embodiment, lighting appliances, such as the appliance 170D, which have been retrofitted for improved efficiency and to provide permanent delamping, for example, an existing lighting fixture retrofitted with super high efficiency ballasts, silver reflectors and two bulbs instead of four bulbs, may be operated when diffuse or solar tracking skylights, such as described above, do not provide sufficient daylight lighting.

In a further embodiment, referring to FIG. 4, the lighting controller 180 may be, for example, a sophisticated T8 and pulse start metal halide lighting controller that reduces KW demand about 15%-18% when the light appliance 170D attached thereto is "ON." The controller 180 may be operated during the DR event, based on control signals supplied by the DR client 16 as discussed below, to control operation of the light appliance 170D to reduce KW demand about 33% to 66% during an DR event. In one embodiment, the lighting controller 180 does not lower voltage supplied to the light appliance 170D and has a negligible loss in lumens, which results in energy efficient ballasts operating at lower temperatures, such as about 13° F. cooler than that of electronic ballasts not conditioned in this manner, thereby decreasing the amount of cooling needed for a space within a facility.

In a further embodiment, the demand reduction actions may include operation of a supplemental energy source 50 having a specialized energy conservation feature, so as to temporarily or permanently reduce KW demand and KwH usage from the grid, and also generation of thermal energy within a facility of an end user, during a DR event. The operation of supplemental energy sources may be arranged in a hierarchy of demand reduction actions as follows. Operation of a large scale solar photovoltaic device would be the first demand reduction action of the hierarchy that is selected to reduce the need for electricity, so as long the processor 100 determines that the monitoring data indicates there is sufficient sun to permit generation of a desired amount of electricity by such device. In the event solar conditions are not sufficient or optimal, the next demand reduction action in the hierarchy that may be selected by the processor 100 is operation of an hot water absorption chiller in conjunction with the larger scale solar thermal device to provide space cooling within a facility at nomimanl cost to the end user. In addition, the next demand reduction action may include activation of a standby gas or diesel generator(s), such as embodied by the SES 50B of the end user 40C as shown in FIG. 2.

In an alternative embodiment, the demand reduction action which is first in a hierarchy may be operation of wind turbines. If wind conditions are not optimal or sufficient to generate a desired amount of electricity as determined from the monitoring data, the next demand reduction action to be selected from the hierarchy may be operation of a standby gas or diesel generator(s).

In a further embodiment, the demand reduction action which is first in a hierarchy may be operation of a standby gas or diesel generator(s), or alternatively gas fired clean burning distributed generation systems if the operation of gas or diesel generator is not permitted due to code restrictions and/or high air pollution at time of operation and/or restricted run times, to generate supplemental electricity for use by the end user. For example, the operation of such supplemental energy sources may be a demand reduction action in geographical regions where summer temperatures are so high that turning a central air conditioning OFF during a DR event is not possible or practical.

In a further embodiment, the supplemental energy source 50 may be a cogeneration or trigeneration system, or a biofuel, natural methane or other alternative fuel source, that provides low cost gas fired electricity, and also provides cooling of interior space within a facility through an absorption chiller without incurring additional cost to the end user.

In another embodiment, a demand reduction action may be resetting an operating temperature curve of an electric chiller which is an appliance 170 of an end user. For example, depending upon an amount of KW demand load to be reduced for a DR event, a supply water temperature set point of the electric chiller may be automatically reset from, say, 44° F. output to 48° F. output or higher, and also a similar reset action may be automatically performed for the return water temperature set point. The processor 130 in block 304 continuously determines from the monitoring data whether the space temperature within a facility of the end user exceeds a specified pre-approved upper limit of, for example, 78° F., and if yes, a demand reduction action is determined in block 306 to reduce the set point(s) of the chiller to maintain the space temperature at no more than the pre-approved upper limit. Further, according to a hierarchy of demand reduction actions and changes in the monitoring data, the processor 100 may determine that the set points of the chiller need to be further reduced, and if such determination is made, a demand reduction action is determined where a standby generator, such as a gas or diesel fired generator or distributed generator, such as the SES 50B of the end user 40C, is automatically activated to generate electricity at the end user itself, thereby reducing KW demand from the power grid.

In a further embodiment, the supplemental energy source of the end user may include a gas fired absorption chiller/heater, which may be cogeneration enabled and permit the end user to switch cooling of interior space within a facility from use of electricity to gas during a DR event. In addition, the switch from electric to gas-based cooling may also be performed at times other than during a DR event, depending upon economic feasibility or when maintenance and/or emergency repairs are performed to electrical cooling systems. In a further embodiment, the determination of a demand reduction action may be based on artificial intelligence, cost of operation of the chiller and chiller operational efficiency at various indoor and outdoor temperatures and relative humidity conditions, and may implement, during or outside of a DR event, use of one chiller as opposed to another chiller.

In another embodiment, the demand reduction action may be automatically diverting condenser water, which ordinarily flows from an electric chiller to a cooling tower, to specially designed ponds and/or fountains that utilize smaller and low power electrical pumps. The operation associated with such demand reduction action, however, may not be a primary choice outside of DR event, because of typically higher maintenance costs of filtration, etc.

In a further embodiment, the demand reduction action may be to reset an existing speed setting of a fan, blower and/or pump of an appliance 170, where appropriate, by utilizing variable frequency drives installed on such devices, thereby providing for a lower fan, blower and/or pump speeds, warmer space temperatures, and less electric KW Demand and KWH usage from the power grid.

In still a further embodiment, a demand reduction action may be to reschedule operation of appliances of the end user having electrical loads exceeding a predetermined amount, which may be considered to be large loads, for periods outside of DR events. The rescheduling may include, for example, operation of appliances used for manufacturing, charging batteries, water pumping such as used at water treatment plants, or operation of any appliance that may be operated before or after a DR event without negatively impacting the end user. In one embodiment, the rescheduling may include completely and safely shutting down computers that are not in use or are in "sleep mode." In a further embodiment, a process performed daily at a commercial facility end user may be rescheduled based on the details included in a "day ahead" DR event, which is typically received a day in advance of the start of the DR event.

In a further embodiment, the processor 100 may use the monitoring data, such as weather forecast data local to the end user, for prediction purposes, and as a result determine a demand reduction action in view of expected weather conditions at the end user. A demand reduction action determined based on expected weather conditions may, for example, reset the temperature setpoint of an A/C system to a lower temperature during morning hours to pre-cool interior space of the facility before the afternoon, when outside temperatures and relative humidity are expected to rise substantially based on the monitoring data.

In block 308, the processor 100 of the DR server 14 generates, and transmits over the network 20, a demand reduction action signal to implement the demand reduction action(s) determined at block 306. The destination of the demand reduction action signal may be, for example, the DR client 16 of the end user 40, or the SES client 18 that controls operation of the SES 50 that may supply supplemental electrical power to the end user.

In one embodiment, referring to FIG. 2, the demand reduction action(s) may be determined for one or more of the sub-end users 52 of the aggregated end user 40C, in accordance with the terms of the DR Agreement for the aggregated end user 40C, and demand reduction action signal(s) may be transmitted from the DR server 14 to one or more of the DR clients 16C, 16D and 16E to implement the demand reduction action(s).

In block 310, the DR client 16 may generate at, and output from, the generator 160 control data and/or control signals, based on the demand reduction action signal received from the DR server 14, to implement the demand reduction action(s) indicated by the received demand reduction signal. In addition, the SES client 220 may control operation of the corresponding SES 50B based on the received demand reduction signal.

In one embodiment, the control data and/or control signals output from the DR client 16 may be digital, analog or in a format suitable for an open protocol, such as LON, BACNET, OBIX and MODBUS. For example, referring to FIG. 4, the DR client 16 may transmit a control signal(s) to the fluorescent lighting controller 180 to provide for operation of the appliance 170D by the controller 180, in accordance with a determined, demand reduction action. In an alternative embodiment, control signals may be transmitted directly to appliances 170 which may include therein, for example, a variable speed drive, a chiller controller, a boiler controller for controlling operation of the associated appliance.

In one embodiment, the generator 160 may include a relay module with a plurality of digital and/or analog outputs attached to respective appliances 170. Control signals are transmitted from the outputs to the respective attached appliances 170 to implement the determined demand reduction action(s), and thus reduce KW demand during a DR event based on the terms for the end user 16 (FIG. 4) set forth in the DR Agreement.

Still referring to FIG. 2, the supplemental energy source device 220 within the end user 40C, based on receipt of a demand reduction signal directly from the DR server 14 or a control signal or control data from the DR client 16, may cause the attached supplemental energy source 50B, such as an emergency standby generator, a distributed energy generator, etc., to supply supplemental electrical power to the end user.

Referring again to FIG. 5, in block 312, the processor 100 of the DR server 14 continuously evaluates the monitoring data, such as for the appliances 170 on which demand reduction actions are being implemented, during the DR event and determines, desirably using artificial intelligence, whether the demand reduction actions should continue to be implemented, or alternative demand reduction actions should be determined and implemented in place or together with the demand reduction actions being implemented, to ensure that the demand load reduction strategies in the DR Agreement for the end user are maintained.

In one embodiment where the processor 100 determines, from the monitoring data, that a permissible upper threshold relating to operation of an appliance, such as a maximum indoor space temperature for a facility of the end user, has changed, the processor 100 may re-arrange an order of demand reduction actions in a hierarchy, desirably using artificial intelligence, to ensure that the modified maximum temperature is not exceeded by implementation of demand reduction actions according to the hierarchy during a DR event. For example, the threshold that is changed may be an indoor space temperature limit, an electricity pricing limit, and appliance operation mode prior to a DR event.

In a further embodiment, the determination of a demand reduction action from a hierarchy is performed using artificial intelligence supplemented by neural networks. For example, the neural networks may apply weightings to demand reduction actions in view of the monitoring data indicating interior space temperature and available daylight, to provide that the determined demand reduction action may implement an energy curtailment objective with minimal undesired impact on the end user.

In one embodiment, the processor 100 may process monitoring data representative of the status of an appliance for which a demand reduction action should have been implemented to confirm whether the appliance in fact has responded to control signals generated at the client device 16 of the end user.

In a further embodiment, each of the appliances 170 that may be controlled at the end user during a DR event include (i) a current sensing transducer (CT) in the electrical power supply line for the appliance, and (ii) a power control relay connected to a secondary wiring control system and whose contacts may be separately controlled to cause interruption of the supply of electrical power to the appliance. For example, if the appliance 170 is operating, current will flow through the voltage leads of the CT, such that the CT will close, and information representative of the CT closing is provided to the DR client 16. If the appliance 170 is not operating, however, current will cease to flow through the voltage leads and the CT will "open," and information representative of the CT being open is provided to the DR client 16. The DR client 16 generates feedback monitoring data from such information which includes information identifying the subject appliance that is operating or not, and then transmits, in substantially real time, such monitoring data to the DR server 14 over the network 20. The processor 100, in turn, in substantially real time, processes the feedback monitoring data to confirm the operating status of the appliance 170, and in particular whether or not the appliance has responded to a control signal transmitted by the DR client 16, based on the demand reduction action signal of the DR server, to turn OFF the appliance. If the appliance has not responded, the DR server 14 determines a further demand reduction action, desirably without human intervention.

Thus, if the DR server 14 determines a demand reduction action, using hierarchical artificial intelligence processing, to turn OFF a particular appliance at an end user, and the feedback monitoring data received at the DR server 14 for the end user indicates that the CT of the appliance remains closed, the appliance continues to operate, and thus, does not contribute to achieving reduced KW demand according to the Agreement for the end user. In such circumstance, the processor 100, based on the feedback monitoring data that is substantially instantaneously supplied to the DR server 14, may determine a further demand reduction action to be implemented at the end user. Referring, for example, to FIGS. 6-9, further demand reduction actions ("plan B" and optionally "plan C") may be implemented at a commercial facility end user, when it is determined, such as by the DR client of the end user or the DR server, based on the monitoring data, that an initial demand reduction action ("plan A") was not successfully implemented. The further demand reduction action of "plan B" may be, for example, instructions for the DR client 16 to generate a control data override signal to automatically turn off the appliance by means of the secondary wiring control system of the appliance 170. In a further embodiment, if the processor 100 still determines that the appliance is not turned OFF from the feedback monitoring data, despite the implementation of the further demand reduction action of plan B, the DR server 14 may implement a "plan C" by transmitting a demand reduction action signal to a computer device at the ISO, utility, ECSP and/or the end user to cause an alarm to sound and/or be visible on a display to alert all concerned parties of the malfunction of the appliance. Advantageously, all parties are notified of the precise appliance that does not turn OFF as commanded, and also exactly where this appliance is located in a facility of the end user. Further, the DR server 14 may transmit, as part of the "plan C" demand reduction action, an email, page, fax and telephone to an operator of the end user that the appliance is not responding to control signals, such that the operator can manually turn off the appliance during the DR event.

In still a further embodiment where each of the appliances 170 at the end user are connected to the building automation system 190, such as shown in FIG. 4, a special emergency override "button" on the system 190 may be depressed by the operator, who has received notification of a malfunctioning appliance(s) 170 from the DR server 14, to electronically turn OFF all appliances, including the malfunctioning appliances, that need to be turned OFF during a DR event to achieve a demand reduction agreed to under the DR Agreement.

In a further embodiment, the processor 100 of the DR server 14 causes transmission of a demand reduction action signal to the DR client 14 in advance of the start time of a DR event, such as five minutes before the start time, where the signal causes the processor 130 of the DR client 14 to control the lighting appliance 170D through the lighting controller 180 to turn on and off several times, and also to control appliances that are speakers at the end user to generate audible warning sounds, a predetermined time before the start of the DR event.

In another embodiment, the processor 100 may use artificial intelligence to minimize undesirable impact to the end user, in view of monitoring data representative of space temperatures and other critical conditions, to determine a second demand reduction action in a predetermined hierarchy of demand reduction actions to be implemented in place of, or together with, the previously determined first demand reduction action of the same or another hierarchy. For example, the processor 100 may determine that one or more or all demand reduction actions be terminated for an end user, such as a residential homeowner, if the monitoring data for the residence indicates that the indoor air temperature exceeds 78-80° F. and/or 65% relative humidity. Consequently, in block 312, the DR server 14 transmits a supplemental demand reduction action signal to the DR client 16, such as the DR client 16C of the end user 40C corresponding to the residence, which causes the appliances within the residence to revert to a default status not associated with a DR event.

In still a further embodiment, referring to FIG. 2, the processor 100 may control a supplemental energy source 50B, which may be a distributed generation plant(s) directly tied into the power grid 30, such as a utility electrical sub-station or a third party electrical power producer, to provide supplemental electrical power to an area associated with the end user 40C which typically suffers brownout conditions due to its isolated location in the electrical power distribution chain, to supply supplemental electrical power on behalf of the aggregated end user 40C. The processor 100 may perform such determination when the monitoring data indicates that several of the sub-end users of the aggregated user 40C decided to "opt out" of a DR event. In such circumstances, the DR server 14 may directly activate the supplemental energy source 50B, by transmitting a demand reduction action signal to the corresponding SES device 18, in accordance with how much supplemental electrical demand reduction is required. The DR server 14 determines the amount of supplemental electrical power that is needed, based on the monitoring data provided from the DR clients 16C, 16D and 16E, which is representative of the real time electric KW demand of each the sub-end users 52A, 52B and 52C of the end-user 40C obtained from respective energy meters 210 (FIG. 4) within the sub-end users 52. The processor 100 compares the cumulative total demand reduction by the aggregate of sub-end users, which may be single home residences or small stores that are part of a chain of stores, with the demand reduction under the DR Agreement for the aggregated end user, and any difference (deficit) in demand reduction is removed by a demand reduction action that automatically activates the supplemental electrical energy source 50B to generate and supply supplemental electrical power at least equal to the deficit. For example, if the aggregated end user 40C entered into a DR Agreement committed to 30 MW of demand reduction for a DR event, and some of the residence or small retail store sub-end users of the aggregated end user 40C opt out of the DR event such that the total aggregated demand reduction only would be 20 MW, the processor 100 automatically and in substantially real time determines such circumstances and activates, by transmission of a demand reduction signal, such as within 60 seconds, to one or more supplemental energy sources 50B, such as a gas fired, bio fuel, diesel, methane, propane, hydrogen fuel cells or some other fueled distributed generators, as needed, to make up the 10 MW deficit. Advantageously, this implementation of demand response for an aggregate of residences or small stores, in accordance with an aspect of the present invention, without human involvement, may redirect electrical power, in the form of supplemental electrical power, to the portions of the grid where the electrical power is needed when there are already historically known areas that suffer from low voltage during high demand periods; and may determine exactly how much electrical power is needed to be diverted or generated by a supplemental energy source.

In one embodiment, the monitoring data may include information representative of whether and how many times a sub-end user of an aggregated end user opted out of a DR event. The DR server, based on such monitoring data, may determine a monetary award for the sub-end user, and the monetary award desirably is determined pro-rata based on the level of participation of the sub-end user in DR events of the aggregated end user. The level of participation may be, for example, a function of the amount of KW demand reduced and/or the percentage of the total number of DR events in a time period, such as a month, for which the sub-end user opted out.

Figure 7:
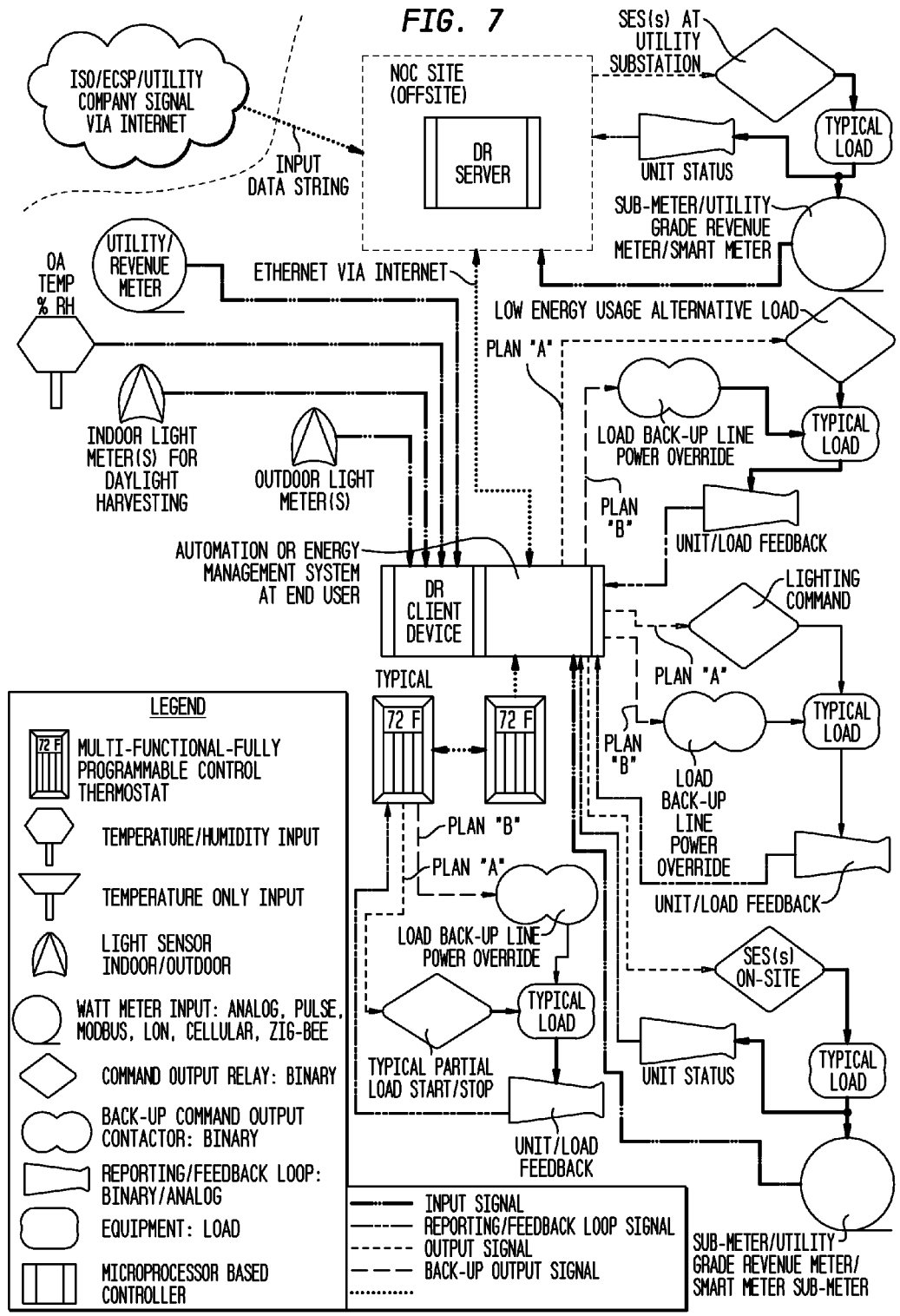
FIG. 7 is another exemplary signal flow arrangement, in accordance with an aspect of the present invention.
Figure 8:
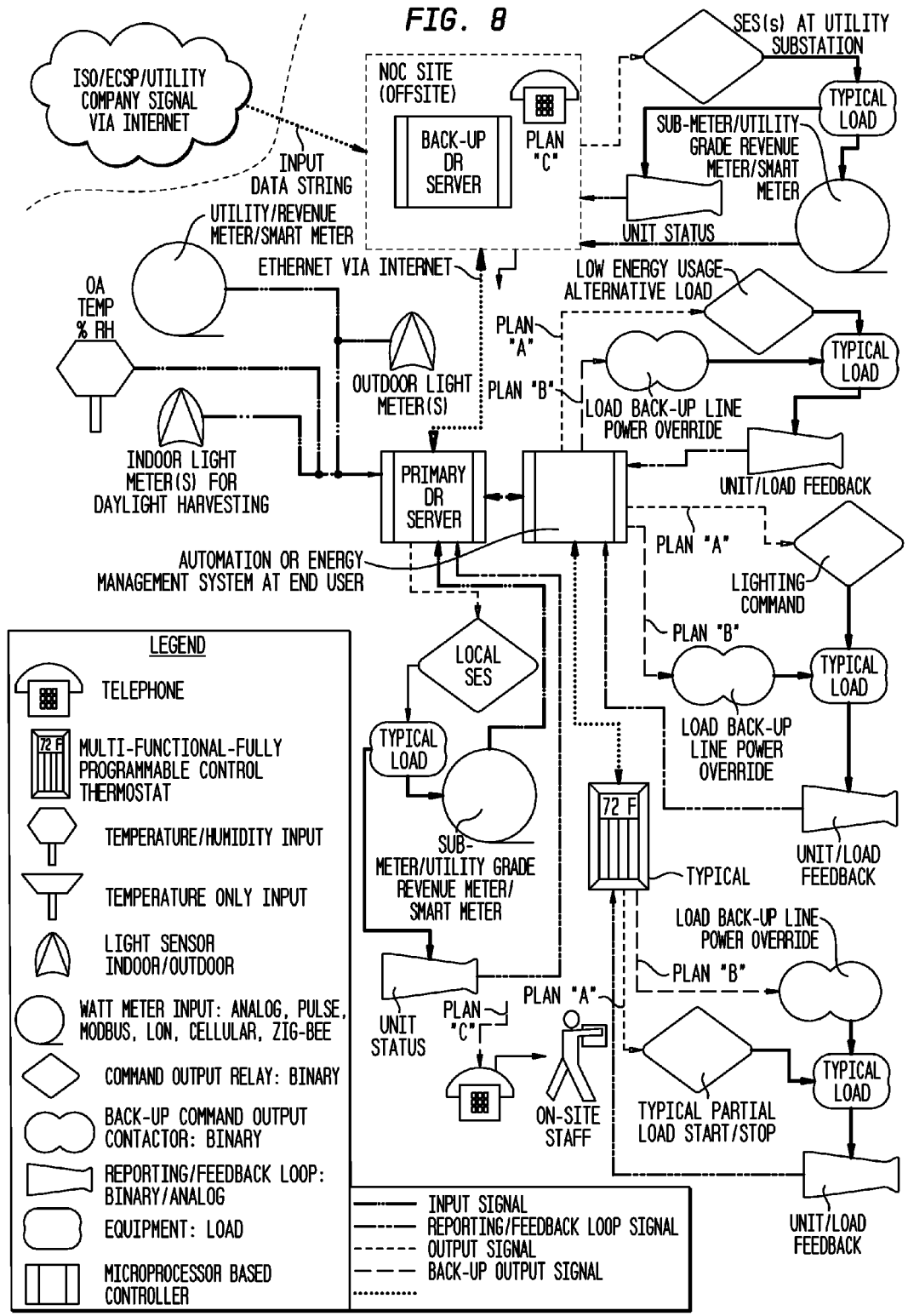
FIG. 8 is another exemplary signal flow arrangement, in accordance with an aspect of the present invention.

In a further embodiment, and referring, for example, to FIGS. 7-8, the processor 100 continuously evaluates monitoring data indicating space temperature, based on information obtained from multifunctional fully programmable control thermostats or "smart thermostats" installed in sub-end user residential units of an aggregated end user. Based on the evaluated monitoring data, the processor 100 may determine a demand reduction action that provides for (i) a return of the smart thermostats to a default condition so as to not implement a KW demand reduction, and (ii) activation of ceiling fans in the sub-end user units to make the occupants of the units more comfortable during the DR event. In this manner, the fully automated demand system of the present invention may achieve energy curtailment objectives for a DR event while maintaining the comfort of occupants of end user residential units, thereby providing for greater participation of residential unit end users to achieve demand reduction and increasing the chances of successful energy curtailment for a DR event initiated by the ISOs, utilities and/or ECSPs. In a further embodiment, a manager(s) of an aggregated group of residences constituting an aggregated end user who entered into a DR Agreement may be paid a monetary incentive to reduce electrical demand, based upon individual agreements between the manager and each owner of a residential sub-end user unit forming the aggregated end user. A similar strategy may be employed for smaller stores that are part of a chain of stores or a similar group of facilities that would otherwise not be able to participate in demand reduction in connection with a DR Agreement without being part of an aggregation.

In one embodiment, the processor 100 of the server 14 may provide for an arcade style or other suitable screen display on a web site that may be accessed, such as from the DR client 16 or a computer, and may show information relating to energy curtailment at an end user 40. The display, for example, may include a listing of appliances at the end user that may be controlled during a DR event to reduce KW demand along with how much electrical power the appliances are currently using; a listing of the appliances and/or supplemental energy sources that may be controlled during respective DR events along with indicators identifying whether the appliances and/or supplemental energy sources are being controlled to reduce KW demand for a particular DR event and what the DR event is; a summary of savings based on implementation of demand reduction according to the DR Agreement, including a display of how much money or other metric is being saved based on demand reduction being performed during a current DR event; and a summary of cumulative savings displaying how much money or other metric has been saved based on implementation of demand reduction implemented according to the DR Agreement for the current year and the current month. In addition, the display may show to the manager of a sub-end user how much financial award the manager has accumulated, or is currently accumulating, based on the implementation of demand reduction at sub-end users for a DR event(s). Thus, the display provided by the inventive system may entertain the manager and also encourage the manager to continuously adjust operation of appliances at the end user to increase reduction of KW demand that may be achieved, during implementation of fully automated energy demand curtailment by the inventive system and method, on a 24/7 basis, even outside of DR events, and therefore achieve even greater financial rewards for both the manager and the company (end user) of the manager. In addition, such actions by the manager may work to the advantage of the ISO/utilities and/or ECSPs in that their KW demand response goals stand a better chance of success.

In a further embodiment, an operator of an end user who accesses a website of the DR server 14 may select a type of music to be supplied, such as from the server 14 or a third party music content source, while the display is shown on the website.

In still a further embodiment, a website of the DR server 14 (may include energy curtailment information that end users, or sub-end users of an aggregated end user, may access to become informed about the DR agreement, potential financial awards and demand reduction actions that may be implemented during a DR event, etc., to provide that the end users may become willing participants in a DR Agreement and, consequently, increase the likelihood of compliance with the terms of the DR Agreement.

In an alternative embodiment, all or substantially all of the processing, and all or substantially all of the data, to implement a fully automated demand response at the end user in accordance with the present invention may be viewed on a display of a computer, similar to the client device 16, located remotely from the end user, such as at a network operations center at which implementation of demand response for a plurality of sub-end users of an aggregated end user may be controlled.

In still a further embodiment, the processor 1110 of the DR server 14 may process monitoring data representative of real time electric meter readings at end users, such as from the energy meter 210 as shown in FIG. 4, to permit ISOs, ECSPs, utility companies and/or end users to confirm, at their own Network Operating Centers (NOCs), via the website of the DR server 14, such as illustrated in FIGS. 6-9, or other methods, exactly how much KW demand is being reduced during a DR event. The display may also be controlled to provide an audit trail of energy consumed from the power grid, which may be used prove compliance with the DR Agreement to the ISOs, utility companies and ECSPs, where the audit trail is desirably in an EXCEL spreadsheet or other formats.

In another embodiment, an operator of an end user may input data on the user input 142 to select sound effects to be generated at the DR client 16 that may alert the operator that certain demand reduction actions are being implemented at the end user.

In another embodiment, a sub-end user of an aggregated end user which is a single residential unit, such as a single family home, may include managed appliances 170B, such as ENERGY STAR rated ceiling fans that may be wirelessly controlled individually from a management system 190 for each occupied room of the house, such as during an DR event.

In addition, each single family home residential unit may include an ENERGY STAR rated whole house dehumidifier. A demand reduction action may include utilization of such appliances during a DR event so as to make warm indoor temperatures during a DR event more bearable for occupants of the residential unit due to much greater air movement, thereby minimizing undesirable impact during a DR event to make the occupants of the residential units as comfortable as possible and thus minimize the number of homeowners that "opt out" of a DR event(s).

In another embodiment, the DR event may be a frequency modulation event, which is a request by an ISO for direct control of an extremely large electrical load, for example, a 10,000 hp motor, at an end user for a short period of time and where the request may be made at anytime. Referring to FIG. 4, at the end user 40, an appliance, such as the appliance 170B, may include a motor operating at an extremely large electrical load and a variable frequency drive or like drive element, as conventionally known in the art, that is used to drive the motor and may receive a fully modulating signal for controlling operation of the motor. The fully modulating signal may be received at the appliance directly from an ISO, or alternatively from the DR client 16 in response to a request for such modulating signal transmitted from the ISO to the DR client 16 or the DR server 14. This modulating signal is typically 0-10 VDC or 4-20 mA, and essentially increases or decreases the speed of the motor within the appliance 170B to help the ISO modulate electrical power frequencies on the grid and also reduce significant KW demand.

In a further aspect, demand reduction actions implemented at an end user may include demand reduction actions implemented after a DR event ends ("post-DR event demand reduction actions"). These post-DR event demand reduction actions may be implemented to avoid too large of a KW demand immediately after a DR event ends, based on appliances being switched to operate at default set points too quickly after the end of the DR event, which would result in high KW demands for the utility billing period immediately following the DR event. After the DR event is concluded, the processor 100 may desirably determine post-DR event demand reduction actions according to a hierarchy of artificial intelligence programmed commands that correspond to those demand reduction actions initiated at the onset of the DR event just terminated, to reduce high KW demand after DR event. The implementation of such post-DR event demand reduction actions may protect expensive HVAC equipment, as well as ensure that new KW demand peaks during a utility billing period are not established.

In still a further aspect, the DR server 14 may determine demand reduction actions to implement demand reduction objectives automatically, and without human involvement, at end users during time periods not within a DR event defined by an ISO, utility company and/or ECSP. For example, the DR server 14 may provide for continuous reduction of KW demand and electrical power KWH usage on a twenty-four a day, seven day a week basis, at an end user during time periods not within a DR event defined by an ISO, utility company and/or ECSP, based on demand reduction criteria provided by the end user. This continuous reduction of KW demand (and associated KWH usage) may include determining demand reduction actions to be implemented at the end user that reduce unnecessary operation of appliances and/or generation of thermal energy, such as by operation of selected appliances in selected operating modes, where the selected appliances involve, for example, space heating, domestic hot water generation and fossil fuel-based appliances used for snow melting.

Figure 9:
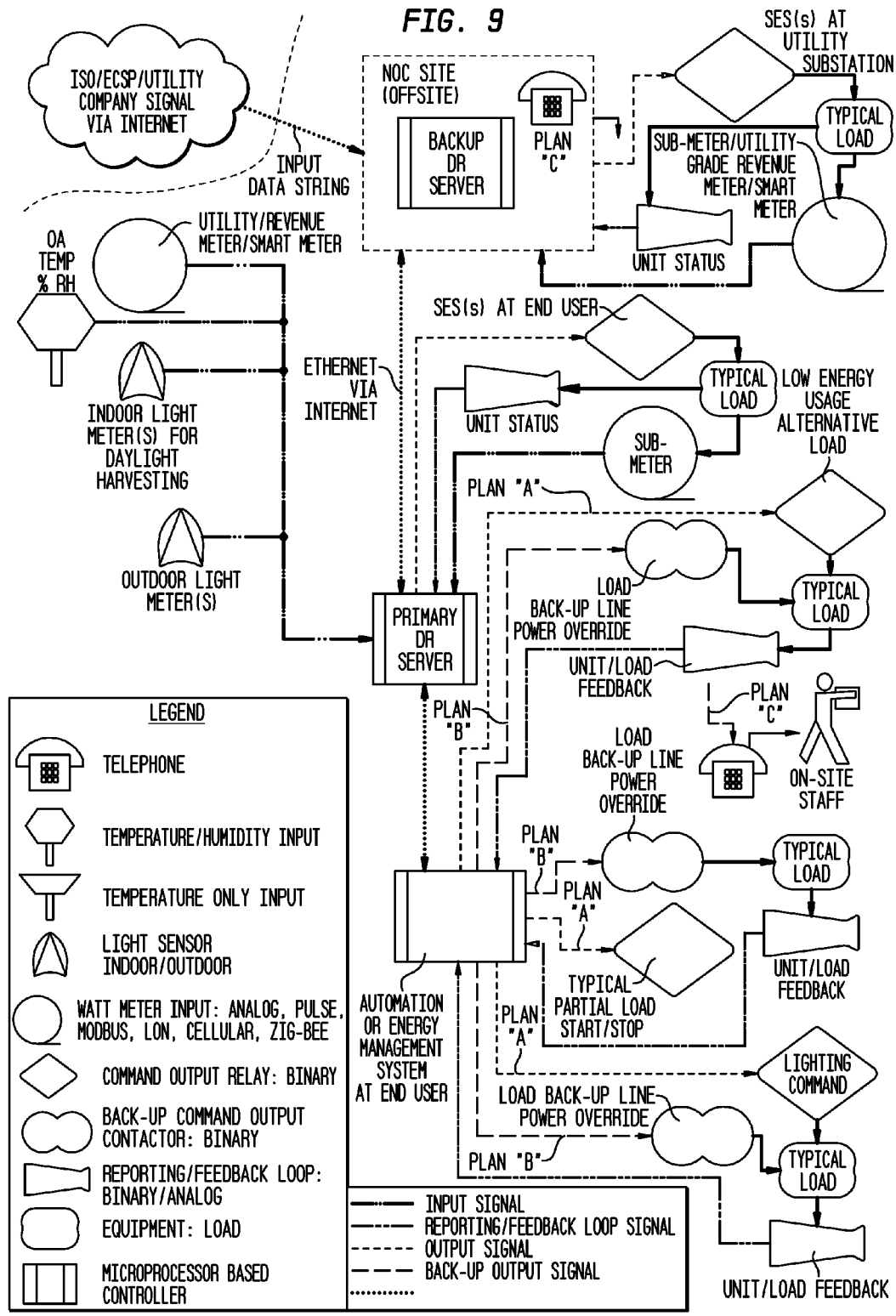
FIG. 9 is another exemplary signal flow arrangement, in accordance with an aspect of the present invention.

Referring to FIGS. 8-9, in one embodiment fully automated demand reduction may be implemented using a primary DR server at the end user, and a back up DR server located remotely from the end user, for example, at a NOC, where the primary and back-up DR servers provide for all or a portion of the functionalities of the exemplary DR server 14 of FIG. 3. The back-up DR server sends demand reduction action signals to the primary DR server and receives monitoring data, which may include feedback data, from the primary DR server, which may cause certain demand reduction actions to be determined for implementation at the end user. In one embodiment, the primary DR server may operate to implement fully automated demand response during a DR event or to automatically implement reduction of KW demand and KWH usage at all times of day outside of a DR event. In the event a problem may arise at the primary DR server that prevents it from fully performing its functions, the back-up DR server, based on artificial intelligence programming along with neural network technology, may become aware of this problem substantially instantaneously and automatically take over the functions of the primary DR server while at the same time handling its own prescribed functions.

In another aspect, the DR server 14 may provide for implementation of a demand reduction action in form of demand rolling, which may occur during a DR event or in the absence of a DR event. In demand rolling, the processor 100 may provide that the DR client 16 reduces a percentage of the KW electrical load for the end user every 15 minutes, and on the 16th minute restores those electrical loads and reduces the same percentage of other electrical loads at the end user so that the total KW demand does not to exceed a pre-established threshold. The features of this demand reduction action are established based on the fact that utility electric meters typically read an average KW demand over 15 minute increments. In one embodiment, the pre-established threshold may differ monthly, and vary from a previously established baseline in accordance with days previously identified as heating and cooling degree days requiring more or less KW demand. In another embodiment, the processor 100 may utilize monitoring data from enthalpy sensors indicating enthalpy information, which is total heat content information including temperature (sensible heat) and moisture in air (latent heat), to determine, using artificial intelligence, whether or not the total KW of demand rolling may be increased without adversely affecting the end user. In a further embodiment, the processor 100 may evaluate monitoring data representative of temperature and/or humidity in the interior space of a facility of an end user impacted by demand rolling, so that the demand reduction action may provide that appliances with certain electric loads are reinstated (turned ON) and other appliances already closest to temperature and/or humidity set points agreed upon by the end user are turned OFF, where different spaces or facilities impacted by the demand rolling may have different set points.

In a further aspect, the DR server 14 may provide for operation of a supplemental energy source if the rate of electricity exceeds the average price in $/Kwh that the end user typically pays. This is made possible by the ISO, utility company, and/or ECSP providing the DR server 14 with the price per KWH hourly for the next 24 hours. Based on this information, the processor 100 of the DR server 14 may automatically determine which hours the price for electricity is higher than the average price the end user pays, and so long as the end user can produce electricity (including fuel, maintenance and equipment burden) for less money than the end user can purchase electricity from the utility company, then the demand reduction action automatically implemented is to turn on a supplemental energy source, such as a distributed generator(s), to produce electricity during those high cost hours. In one embodiment, the determination by the processor 100 is in accordance with an "Economic Dispatch" model, which includes rules and/or information regarding when it makes economic sense to turn on a supplemental energy source. In a further embodiment, the determination of a demand reduction action is based on artificial intelligence and in accordance with an economic dispatch model, and may implement, during or outside of a DR event, a switch of energy sources, such as from electric to gas cooling, or use of one chiller as opposed to another chiller.

In another embodiment, the processor 100, during a real time electrical power pricing program, which may occur at the same time as a DR event, may compare real time electrical consumption data to electricity price set points of the end user and, based on such comparison, determine if any appliances should be turned off or otherwise operated to reduce KW demand to satisfy an average electrical price maximum set by the end user. The end user may be paid an incentive for taking advantage of real time pricing programs offered by the ISO, uUtilities and/or ECSPs.

Furthermore, it is to be understood that the determination of demand reduction actions for reducing KW demand of electrical power from the power grid, in accordance with the present invention, may be similarly adapted to reduce demand for other resources consumable by humans which may become in scarce supply and high demand, and whose costs are a function of supply and demand, such as fossil fuels, clean water and the like.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for fully automated energy demand curtailment, the method comprising:
   determining, by a processor, a first demand response event based on electronic message data indicating a demand response event received over a communication network, wherein the electronic message data indicates one of a plurality of demand response events including the first demand response event;
   determining, by the processor, one or more demand reduction actions to be implemented at one or more end users who agreed to implement demand reduction for the first demand response event, wherein the one or more demand reduction actions are determined based on energy demand curtailment objectives of the first demand response event and a hierarchy of predetermined demand reduction actions for the first demand response event available for the one or more end users and ordered to minimize undesired impact at the one or more end users,
   wherein a first of predetermined demand reduction actions includes supplying energy from an alternative energy source to operate a first appliance at the one or more end users;
   monitoring data related to implementing energy demand curtailment at the one or more end users; and
   generating a signal or control data to implement the one or more demand reduction actions for at least one of one or more appliances of the one or more end users and one or more supplemental energy sources for supplying energy to the one or more end users.

2. The method of claim 1, wherein the monitoring data includes at least one of real time interior environmental data for the one or more end users; real time exterior environmental data for to the one or more end users; real time energy consumption data for the one or more end users; and real time supplemental energy generation data for the one or more end users; appliance operation data for the one or more end users; and supplemental energy source operation data.

3. The method of claim 1, wherein a first of the predetermined demand reduction actions includes activating a first appliance at the one or more end users having a lower energy demand load than a second appliance at the one or more end users having a function corresponding to that of the first appliance.

4. The method of claim 3, where the first predetermined reduction action further includes controlling the second appliance to reduce its energy demand.

5. The method of claim 1, wherein the alternative energy source includes at least one of a solar energy source, a biodiesel, gas or diesel generator, a wind turbine, and a cogeneration or trigeneration energy source.

6. The method of claim 1, wherein a first of the predetermined reduction actions includes controlling operation of a first appliance at the one or more end users to operate in a mode to reduce energy demand.

7. The method of claim 6, wherein the mode includes at least one of a lower operating temperature and a lower motor or fan speed.

8. The method of claim 1, wherein a first of the predetermined reduction actions includes rescheduling an operating time period of an appliance at the one or more end users whose energy demand during operation exceeds a predetermined threshold.

9. The method of claim 1, wherein the determining of the one or more demand reduction actions is view of a predetermined threshold defined by the one or more end users.

10. The method of claim 9, wherein the predetermined threshold is a predetermined maximum temperature and/or relative humidity for an interior of a facility of the one or more end users.

11. The method of claim 1, wherein a first end user of the one or more end users is an aggregation of a plurality of sub-end users.

12. The method of claim 11, wherein the one or more demand reduction actions are determined for the respective sub-end users based on criteria defined by the sub-end users and using artificial intelligence including use of neural networks.

13. The method of claim 11 further comprising: generating a signal or control data to terminate implementation of a first demand reduction action at a first sub-end user of the first end user where a threshold defined by the first sub-end user for the first demand response event is exceeded.

14. The method of claim 13, wherein the threshold is a temperature and/or relative humidity level within a facility of the first sub-end user.

15. The method of claim 13 further comprising; generating a signal or control data to implement a second demand reduction action included in the predetermined demand reduction actions of the hierarchy, in place of the first demand reduction action, wherein the second demand reduction action is determined using artificial intelligence.

16. The method of claim 11, wherein a first of the predetermined reduction actions includes supplying supplemental electrical energy from a distributed energy source to the first end user to satisfy the energy demand curtailment objectives for the first demand response event.

17. The method of claim 16, wherein the first predetermined reduction action is implemented based on the monitoring data indicating that the first end user is not fully complying with the first demand response event.

18. The method of claim 11, wherein a first of the predetermined reduction actions includes supplying supplemental electrical energy from a supplemental energy source to the first end user to satisfy the energy demand curtailment objectives for the first demand response event, wherein the supplemental energy source is at an electrical power sub-station or a third party electrical power source.

19. The method of claim 11, wherein the first predetermined reduction action is based on the monitoring data indicating a deficit in demand reduction for the first end user for the first demand response event, and the method further includes:
rendering, in substantially real time, data representative of extent of participation of the first end user in the first demand response event, and wherein the rendered data is presentable in a predetermined format.

20. The method of claim 19, wherein the rendered data represents electrical energy demand by the one or more end users during the first demand response event.

21. The method of claim 19, wherein the rendered data represents generation of supplemental energy by a supplemental energy source on behalf of the one or more ends users during the first demand response event.

22. The method of claim 11, wherein a monetary award determined for the sub-end users is a function of level of participation of the sub-end users to reduce demand for determined demand response events.

23. The method of claim 1, wherein implementation of a first demand reduction action at the one or more end users is preceded by implementation of an event notification action at the one or more end users including at least one of sounding an alarm and flashing of a majority of lights a predetermined time before the first demand reduction action is implemented, thereby eliminating a need for the one or more end users to be advised of the first demand response event by email, fax, phone or other method.

24. The method of claim 1, wherein the electronic message data is included in at least one of an email, an XML document or a SOAP document.

25. The method of claim 1 further comprising: generating a second signal or second control data to implement a first demand reduction action at a first appliance of the one or more end users when the monitoring data indicates the first demand reduction action did not achieve a demand reduction corresponding to the first demand reduction action at the first appliance.

26. The method of claim 25 further comprising: notifying the one or more end users that the first demand reduction action did not achieve a demand reduction corresponding to the first demand reduction action at the first appliance.

27. The method of claim 26 further comprising: generating a third signal or control data to turn off the first appliance based on an action taken by an operator of the one or more end users.

28. The method of claim 1, wherein a first appliance of the one or more end users includes means for receiving a frequency modulation control signal and decreasing or increasing speed of a motor within the first appliance in accordance with the frequency modulation control signal.

29. A method for fully automated energy demand curtailment, the method comprising:
receiving, a processor, an electronic message transmitted over a communication network indicating a demand response event;
processing the electronic message, by the processor, to convert the electronic message into a demand response event signal, wherein the demand response event signal corresponds to a first demand response event of a plurality of demand response events;
determining, by the processor, one or more demand reduction actions to be implemented at one or more end users under contract to implement demand reduction for the first demand response event;
wherein a first of predetermined demand reduction actions includes supplying energy from an alternative energy source to operate a first appliance at the one or more end users; and
generating a signal or control data to implement the one or more demand reduction actions at one or more energy devices of, or associated with, the one or more end users.

30. An apparatus for fully automated energy demand curtailment, the apparatus comprising:
a demand response event determination unit to determine, based on electronic message data indicating a demand response event received over a communication network, a first demand response event, wherein the electronic message data indicates one of a plurality demand response events including the first demand response event;
a demand reduction action unit to determine one or more demand reduction actions to be implemented at one or more end users under contract to implement demand reduction for the first demand response event, wherein the one or more demand reduction actions are determined based on energy demand curtailment objectives of the first demand response event and a hierarchy of predetermined demand reduction actions for the first demand response event available for the one or more end users and ordered to minimize undesired impact at the one or more end users, wherein a first of predetermined demand reduction actions includes supplying energy from an alternative energy source to operate a first appliance at the one or more end users
monitoring data related to implementing energy demand curtailment at the one or more end users; and
a demand reduction action signal generator to generate a demand reduction action signal to implement the one or more demand reduction actions at least one of one or more appliances of the one or more end users and one or more supplemental energy sources for supplying energy to the one or more end users.

31. The apparatus of claim 30 further comprising: display control means to control generation of a display including rendering data associated with implementation of demand reduction at the one or more end users.

32. The apparatus of claim 31, wherein the rendering data includes substantially real time data indicating extent of participation of the one or more end users in the demand response events and substantially real time electrical power demand by the one or more ends users, and wherein the rendering data is presentable in a predetermined format.

33. The apparatus of claim 30, wherein the monitoring data includes at least one of real time interior environmental data for the one or more end users; real time exterior environmental data for to the one or more end users; real time energy consumption data for the one or more end users; and real time supplemental energy generation data for the one or more end users; appliance operation data for the one or more end users; and supplemental energy source operation data.

34. The apparatus of claim 30 further comprising: a transmitter to transmit the demand reduction action signal to at least one of the one or more appliances of the one or more end users and the one or more supplemental energy sources for supplying energy to the one or more end users.

35. The apparatus of claim 30 further comprising: a receiver to receive the electronic message data from an apparatus, wherein the apparatus is for generating a control signal or control data based on the demand reduction action signal to implement the one or more demand reductions at least one of a first appliance of a first of the end users and a first supplemental energy source for supplying energy to the first end user.

36. An apparatus for fully automated energy demand curtailment, the apparatus comprising:
  a monitoring data unit to create monitoring data based on information supplied by or acquired from an appliance of an end user,
  an energy consumption meter of the end user, and an environmental conditions and appliance operational status monitor of the end user connected to the apparatus;
  a generator to generate a signal or control data to implement one or more demand reduction actions for at least one of the appliance of the end user and a supplemental energy source for supplying supplemental energy to the end user based on a demand reduction signal received at the apparatus,
  wherein the demand reduction signal indicates the one or more demand reductions actions which have been determined in accordance with a first demand response event determined from an electronic message data received over a communication network, and
  wherein the one or more demand reduction actions are to be implemented at the end user who is under contract to implement demand reduction for the first demand response event,
  wherein the one or more demand reduction actions are determined based on energy demand curtailment objectives of the first demand response event and a hierarchy of predetermined demand reduction actions for the first demand response event available for the end user and ordered to minimize undesired impact at the end user, wherein a first of predetermined demand reduction actions includes supplying energy from an alternative energy source to operate a first appliance at the one or more end users.

37. The apparatus of claim 36 further comprising: an input unit to receive input data representative of a criteria relating to the demand reduction actions available for the end user.

38. The apparatus of claim 36, wherein the monitoring data includes at least one of real time interior environmental data for the one or more end users; real time exterior environmental data for to the one or more end users; real time energy consumption data for the one or more end users; and real time supplemental energy generation data for the one or more end users; appliance operation data for the one or more end users; and supplemental energy source operation data.

39. The apparatus of claim 36 further comprising: a transmitter to transmit the monitoring data and user input data to a demand reduction action apparatus at which the one or more demand reduction actions are determined.

40. A method for fully automated energy demand curtailment, the method comprising:
  determining, by a processor, one or more demand reduction actions to be implemented automatically at one or more end users who provide criteria for implementation of demand reduction, wherein the one or more demand reduction actions are determined based on a hierarchy of predetermined demand reduction actions available for the one or more end users and ordered to minimize undesired impact at the one or more end users:
  wherein a first of predetermined demand reduction actions includes supplying energy from an alternative energy source to operate a first appliance at the one or more end users;
  monitoring data related to implementing energy demand curtailment at the one or more end users; and
  generating a signal or control data to implement the one or more demand reduction actions at least one of one or more appliances of the one or more end users and one or more supplemental energy sources for supplying energy to the one or more end users.

41. The method of claim 40, wherein the criteria is associated with real time pricing of electrical power, and a first demand reduction action is supplying a predetermined amount of supplemental electrical power to the one or more end users from a supplemental electrical power source during a predetermined time period.

* * * * *

UNITED STATES PATENT AND TRADEMARK OFFICE
CERTIFICATE OF CORRECTION

PATENT NO.         : 8,412,654 B2
APPLICATION NO.    : 12/587564
DATED              : April 2, 2013
INVENTOR(S)        : Rey Montalvo It is certified that error appears in the above-identified patent and that said Letters Patent is hereby corrected as shown below:

On title page, item (56), under "OTHER PUBLICATIONS", in column 2, line 1, delete "Opinino," and insert -- Opinion, --, therefor.

In the Specification

In column 12, line 10, delete "server" and insert -- server 14 --, therefor.

In column 14, line 27, delete "information-representative" and insert -- information representative --, therefor.

In column 16, line 38, delete "server" and insert -- server 14 --, therefor.

In column 17, line 15, delete "network" and insert -- network 20 --, therefor.

In column 19, line 55, delete "nomimanl" and insert -- nominal --, therefor.

In column 26, line 44, delete "1110" and insert -- 100 --, therefor.

Signed and Sealed this
Ninth Day of July, 2013

Teresa Stanek Rea
*Acting Director of the United States Patent and Trademark Office*